United States Patent
Hirasawa

(10) Patent No.: US 6,473,797 B2
(45) Date of Patent: *Oct. 29, 2002

(54) UNCONNECTED-PORT DEVICE DETECTION METHOD, APPARATUS, AND STORAGE MEDIUM

(75) Inventor: Masahide Hirasawa, Sagamihara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,395

(22) Filed: Dec. 2, 1998

(65) Prior Publication Data

US 2002/0089531 A1 Jul. 11, 2002

(30) Foreign Application Priority Data

Dec. 5, 1997 (JP) .............................. 9-335461

(51) Int. Cl.$^7$ .............................. G06F 15/16
(52) U.S. Cl. ...................... 709/224; 345/736
(58) Field of Search .................... 375/225; 345/339, 345/356, 734, 736; 710/15, 17, 19, 104; 709/223, 224, 227, 220

(56) References Cited

U.S. PATENT DOCUMENTS

| | | | | |
|---|---|---|---|---|
| 5,504,757 A | * | 4/1996 | Cook et al. | 375/225 |
| 5,548,722 A | * | 8/1996 | Jalalian et al. | 709/220 |
| 5,724,517 A | * | 3/1998 | Cook et al. | 709/227 |
| 5,821,937 A | * | 10/1998 | Tonelli et al. | 345/356 |
| 5,883,621 A | * | 3/1999 | Iwamura | 345/339 |
| 6,009,466 A | * | 12/1999 | Axberg et al. | 709/220 |
| 6,038,625 A | * | 3/2000 | Ogino et al. | 710/104 |

* cited by examiner

*Primary Examiner*—Patrice Winder
(74) *Attorney, Agent, or Firm*—Fitzpatrick, Cella, Harper & Scinto

(57) ABSTRACT

An information communicating apparatus and method are featured in retrieving one or more device constituting a network which satisfies predetermined conditions (e.g., connector type and data transfer speed) and has a communication port not connected to another unit of device. The retrieved device is then graphically displayed on a display screen. Users can be informed of the device having a vacant port in a manner easy to understand, and add-on of new device to the network can be realized readily and efficiently.

21 Claims, 40 Drawing Sheets

RETRIEVAL RESULT

| EQUIPMENT INFORMATION | NUMBER OF VACANT PORTS |
|---|---|
| TV MONITOR (101) | 1 |
| CD (108) | 1 |

CONNECTABLE TO EQUIPMENT LISTED IN TABLE

FIG. 9

PLEASE INPUT CONNECTOR TYPE (4-PIN OR 6-PIN)

4-PIN

RETRIEVAL RESULT

| EQUIPMENT INFORMATION | NUMBER OF VACANT PORTS |
|---|---|
| TV MONITOR (101) | 1 |

CONNECTABLE TO EQUIPMENT LISTED IN TABLE

PLEASE INPUT CONNECTOR TYPE (4-PIN OR 6-PIN)

| 4-PIN |

RETRIEVAL RESULT

| EQUIPMENT INFORMATION | CONNECTOR TYPE |
|---|---|
| CD (106) | 4-PIN |

PLEASE CONNECT AFTER REMOVING CONNECTOR
OF EQUIPMENT LISTED IN TABLE

PLEASE INPUT MAXIMUM DATA TRANSFER SPEED

100Mbps

RETRIEVAL RESULT

| EQUIPMENT INFORMATION | MAXIMUM DATA TRANSFER SPEED | NUMBER OF VACANT PORTS |
|---|---|---|
| TV MONITOR (101) | 400Mbps | 1 |
| CD (108) | 100Mbps | 1 |

PLEASE CONNECT TO EQUIPMENT LISTED IN TABLE

FIG. 23

(SIGNAL OF EXCLUSIVE LOGICAL SUM OF DATA AND STROVE)

BRANCH: NODE CONNECTED TO TWO OR MORE NODES
LEAF : NODE CONNECTED TO ONLY ONE NODE

☐ : PORT
c : PORT (CHILD PORT) CONNECTED TO PARENT PORT
p : PORT (PARENT PORT) CONNECTED TO CHILD PORT

REQUEST FOR RIGHT OF USE OF BUS

PERMIT USE OF BUS

UNCONNECTED-PORT DEVICE DETECTION METHOD, APPARATUS, AND STORAGE MEDIUM

BACKGROUND OF THE INVENTION

1. Field of the Invention

The present invention relates to a data communicating apparatus and method, and to a computer readable storage medium storing programs for use in the apparatus and method. More specifically, the present invention relates to techniques for giving users information that is useful in management of a network (e.g., connection relations of devices on the network).

2. Description of the Related Art

Recently, it has been common for a personal computer (referred to as a "PC" hereinafter) and associated peripheral devices, such as a hard disk and a printer, to be connected to each other by a digital interface called SCSI (Small Computer System Interface).

It is pointed out that the following problems arise when the SCSI is used to connect the PC with AV (audiovisual) device such as a digital camera or a digital VTR integral with a camera: (1) the SCSI is not adaptable for transfer of mobile pictures because the maximum data transfer speed of the SCSI is 5 Mbytes/sec, (2) the SCSI is used to constitute only a daisy chain connection, and is not adaptable for a system having flexible topology, (3) the SCSI has no function for ensuring transmission of data in a certain amount within a certain period of time, and has difficulties in realizing real-time transmission of mobile pictures and voice, and (4) because the SCSI has no function for automatically recognizing the entire system configuration when the system power is turned on, when a new device is connected to the system, or when a device is disconnected from it, users are required to set the ID numbers of individual devices themselves.

As one next-generation digital interface for solving the above-mentioned problems, there is presently proposed a digital interface in conformity with the IEEE 1394-1995 Standard (referred to as the "1394 interface" hereinafter).

A system constructed using the 1394 interface has functions of, e.g., automatically recognizing connection or disconnection of a connectable device and then automatically setting the ID numbers of individual devices based on the recognition result. The system having those functions does not require users to set the ID numbers of individual devices one by one themselves. Thus, such a system is advantageous in freeing users from troublesome setting when a new device is connected to the system, or when a device is disconnected from it.

However, there has been a problem that when a new device is connected to the above system, the user must check all devices in the system one by one and confirm which device has a vacant port. For a system to which many devices are connected in a complex configuration, particularly, a lot of time and labor are needed to complete the connection because of difficulty in finding to which device the new device can be connected. In other words, the above system is still very inconvenient to users.

Another inconvenience of the above system is that all devices in the system must be checked one by one in order to know whether the connector type of the vacant port is the same as that of the port of the newly connected device (specifically, whether the number and shape of pins of the connector of the vacant port are the same as those of the port of a device to be added).

Further, in the above system, it has been impossible to select the destination of connection, taking into account the communicating function of the interface at the destination of connection (e.g., an adaptable maximum transfer speed).

SUMMARY OF THE INVENTION

An object of the present invention is to solve the above-described problems.

Another object of the present invention is, in an information communicating apparatus and method, to inform users of a device having a vacant port in a way easy to understand, and to realize add-on setting of a new device to a network readily and efficiently.

Still another object of the present invention is, in an information communicating apparatus and method, to inform users of a device which has a vacant port and which is optimum for conditions (such as functions and capability) of the port of the device to be added to the network, in a way easy to understand, and to realize add-on setting of a new device to the network readily and efficiently.

Still another object of the present invention is, in an information communicating apparatus and method, to inform users of device optimum for conditions such as functions and capability of the port of the device to be added to the network and serving as a terminal end of the network, in a way easy to understand, if there is no device having a vacant port, and to realize add-on setting of a new device to the network readily and efficiently.

As a preferred embodiment for such objects, the present invention includes an information communicating apparatus comprising retrieval means for identifying that one among plural devices constituting a network which meets predetermined conditions and has a communication port not connected to another device, and display means for displaying an identification of the device found by the retrieval means.

As another preferred embodiment for such objects, the present invention includes an information communicating apparatus comprising an interface broadcasting information (hereinafter, "self-information") relating to itself when a change in connection configuration of a network is detected, retrieval means for identifying the device having a not-connected communication port based on the self-information broadcasted from each device, and informing means for informing a user or an application of a retrieval result provided by the retrieval means.

As still another preferred embodiment for such objects, the present invention includes an information communicating method comprising the steps of identifying that one among plural devices constituting a network which meets predetermined conditions and has a communication port not connected to another device, and displaying an identification of that device.

As still another preferred embodiment for such objects, the present invention includes an information communicating method comprising the steps of broadcasting self-information relating to itself when a change in connection configuration of a network is detected, retrieving an identification of the device having a not-connected communication port based on the self-information broadcasted from each device, and informing a user or application of the retrieval result.

Still another object of the present invention is to provide a computer readable storage medium storing programs that can retrieve an identification of the device having a vacant port, which is optimum for conditions such as functions and capability of the port of the device to be added to a network, and inform users of the retrieval result in a way easy to understand, thereby realizing add-on setting of a new device to the network readily and efficiently.

As one preferred embodiment for such an object, the present invention includes a computer readable storage medium storing programs, comprising the steps of retrieving an identification of that one among plural devices constituting a network which meets predetermined conditions and has a communication port not connected to another device, and displaying the retrieved device identification graphically.

Still other objects of the present invention, and the advantages thereof, will become fully apparent from the following detailed description of the embodiments.

BRIEF DESCRIPTION OF THE DRAWINGS

FIG. 9 is a representation showing one example of a screen image displayed on the PC in the second embodiment.

FIG. 14 is a representation showing one example of a screen image displayed on the PC in the third embodiment.

FIG. 19 is a representation showing one example of a screen image displayed on the PC in the fourth embodiment.

FIG. 23 is a representation showing one example of a screen image displayed on the PC in the fifth embodiment.

DETAILED DESCRIPTION OF THE PREFERRED EMBODIMENTS

The preferred embodiments of the present invention will now be described in detail with reference to the accompanying drawings.

(Basic Configuration)

Figure 1:
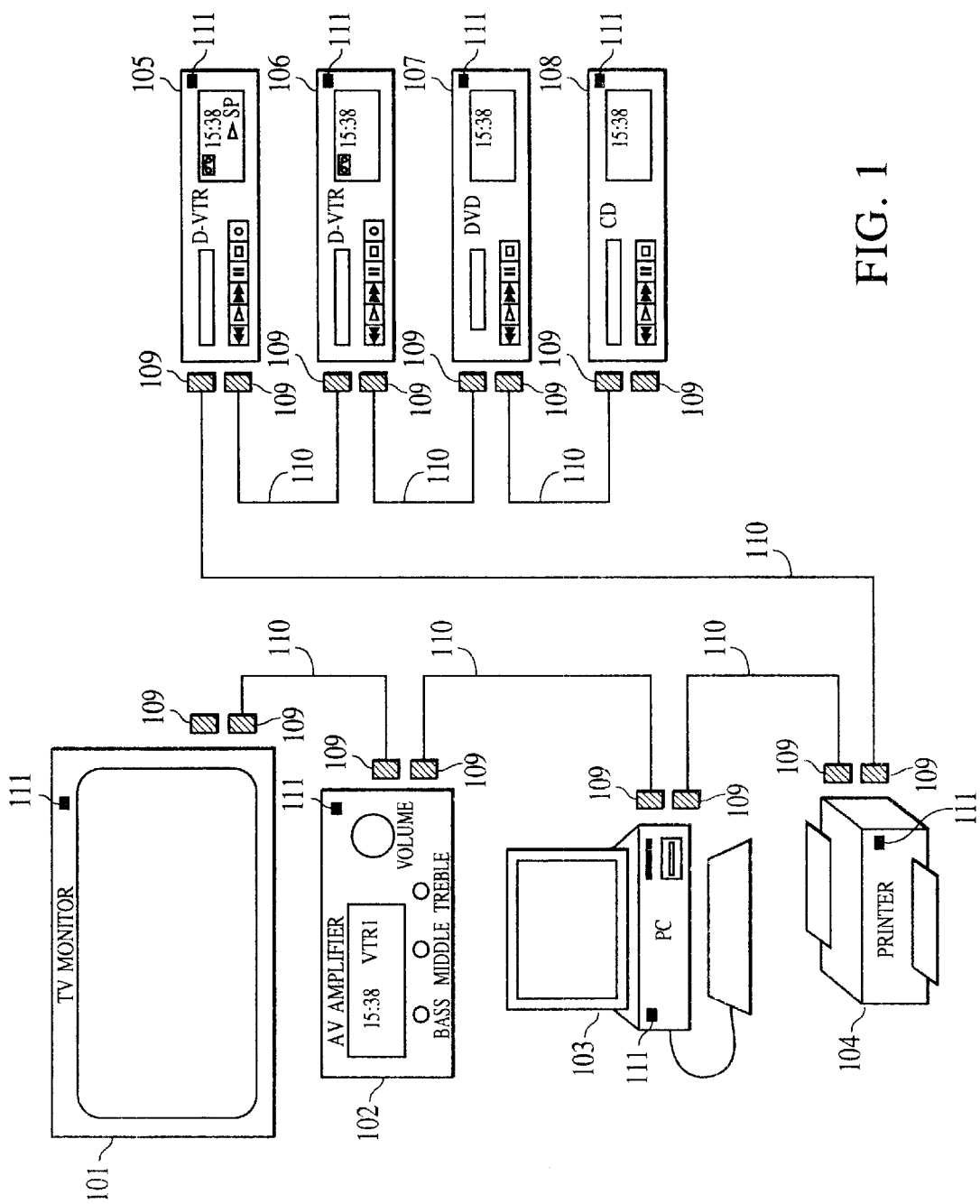
FIG. 1 is a block diagram showing a configuration of a communication system according to one embodiment.

FIG. 1 shows one embodiment of a communication system constituted by a plurality of communicating devices each including a digital interface (referred to as the "1394 interface" hereinafter) in conformity with the mentioned IEEE Standard for a High Performance Serial Bus (IEEE 1394-1995 Standard).

In FIG. 1, denoted by reference numeral 101 is a TV monitor for converting image data and voice data possessed by each communicating device into image signals and voice signals in conformity with the standard television mode (e.g., NTSC or PAL mode) for audiovisual presentation to users, 102 is an AV amplifier for selecting particular communicating devices and transferring image data and voice data output from the selected devices to the TV monitor 101, 103 is a personal computer (referred to as a "PC" hereinafter) capable of processing image data, voice data, text data, etc., possessed by each communicating device using predetermined application software, and 104 is a printer capable of printing out image data and text data possessed by each communicating device, e.g., printing out image data processed by the PC 103.

Further, in FIG. 1, denoted by 105 is a first stationary digital video tape recorder ("VTR") capable of reproducing image data and voice data recorded on a recording medium such as a magnetic tape, and supplying the reproduced data to another communicating device. The first stationary digital VTR 105 can also record image data and voice data possessed by each communicating device. Denoted by 106 is a second stationary digital VTR having the same functions as the first stationary digital VTR 105, 107 is a "DVD" (Digital Video Disc) player, and 108 is a CD player.

In FIG. 1, the 1394 interface of each communicating device (101–108) has one or more ports 109. Users can construct a bus type communication system by interconnecting the ports through serial bus cables 110. The serial bus cable 110 is a communication cable in conformity with the IEEE 1394 Standard, and is made up of a set of twisted-pair cables used for transmitting data signals and a set of twisted-pair cables used for transmitting strobe signals.

Moreover, in FIG. 1, each communicating device (101–108) has an indication lamp 111 for indicating the presence of a vacant port to which an additional device is connectable. The indication lamp 111 is turned on in response to a control command from a management unit (e.g., the PC 103) which manages the connection configuration of the communication system. Note that while the indication lamp 111 is used in the illustrated embodiment to indicate the presence of a vacant port, a display unit, e.g., a liquid crystal panel, provided in each device may be used instead or also, to present required indication.

The communication system shown in FIG. 1 may be modified such that other communicating devices (e.g., an external storage device such as a hard disc and a portable device such as a digital camera or a digital VTR integral with a camera, each of these devices having a 1394 interface) are connected respectively to the vacant ports 109 of the TV monitor 101 and the CD player 108.

Prior to describing the processing operation of the communication system of the illustrated embodiment, the 1394 interface provided in the communicating devices (101–108) of FIG. 1 will be described. The construction and basic functions of the 1394 interface will be described below in detail with reference to FIGS. 25 to 40.

(1) Summary

Figure 25:
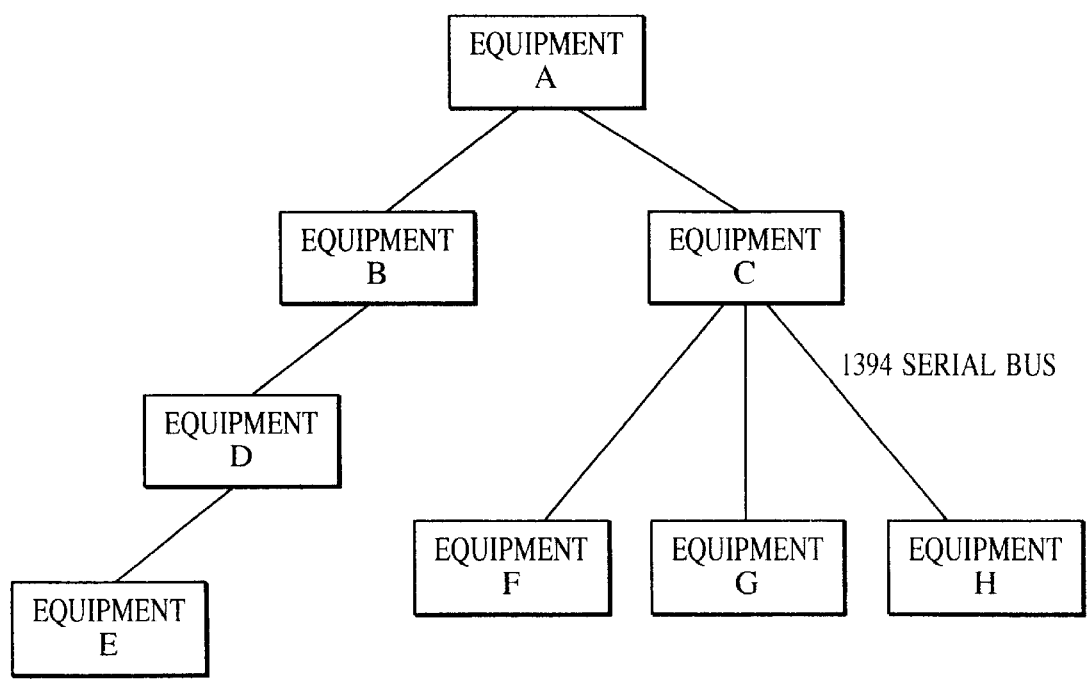
FIG. 25 is a diagram showing one example of a 1394 network constituted by a plurality of nodes.

FIG. 25 shows one example of a communication system (referred to as a "1394 network" hereinafter) constituted by a plurality of devices (referred to as "nodes" hereinafter) each having a 1394 interface. The 1394 network is a bus type network for serially communicating data. In FIG. 25, the nodes A–H are connected through communication cables in conformity with the IEEE 1394 Standard. These nodes A–H comprise, e.g., a PC, a digital VTR, a DVD player, a digital camera, a hard disk, a monitor and so on.

As shown in FIG. 25, the 1394 interface enables a network to be connected with such high flexibility as including both daisy chain connection and node branching connection, in a mixed manner. Also, the 1394 interface automatically executes processing of the so-called bus resetting upon detecting bus reset, e.g., disconnection of the connected device from the network, addition of a new device to the network, and power-on/off of the connected device. Here, the term "bus resetting" means processing to automatically recognize a new connection configuration of the network and automatically assign ID information to each device.

Further, the 1394 interface has a function of relaying data transmitted from another device. With this function, all devices can grasp the operating situation of the bus. The 1394 interface also has a function called Plug & Play. With this function, it is possible to connect a new device and to automatically recognize connection of the device without turning off the power of all devices. Moreover, the 1394 interface is adaptable for data transfer speeds of 100/200/400 Mbps. Because a device having a higher data transfer speed can support a lower data transfer speed, the 1394 interface can be used to interconnect devices having different data transfer speeds.

In addition, the 1394 interface is adaptable for two different data transfer modes (i.e., asynchronous transfer mode and isochronous transfer mode). The asynchronous transfer mode is effective in transferring data required to be transferred asynchronously on demand (i.e., control signals, file data, etc.). The isochronous transfer mode is effective in transferring data required to be transferred continuously in predetermined amounts at a constant data rate (i.e., video data, audio data, etc.).

The asynchronous transfer mode and the isochronous transfer mode can be mixed in each communication cycle (one cycle being usually 125 $\mu$s). These transfer modes are each executed subsequent to transfer of a cycle start packet (referred to as a "CSP" hereinafter) which indicates the start of cycle. The isochronous transfer mode is given higher priority than the asynchronous transfer mode. Also, the transfer band of the isochronous transfer mode is secured in each period of communication cycle.

(2) Architecture

Components of the 1394 interface will now be described with reference to FIG. 26.

The 1394 interface is functionally made up of a plurality of layers. In FIG. 26, denoted by 2601 is a communication cable in conformity with the IEEE 1394 Standard. The communication cable 2601 is connected via a communication port 2602 to a physical layer 2603 included in a hardware section.

Figure 26:
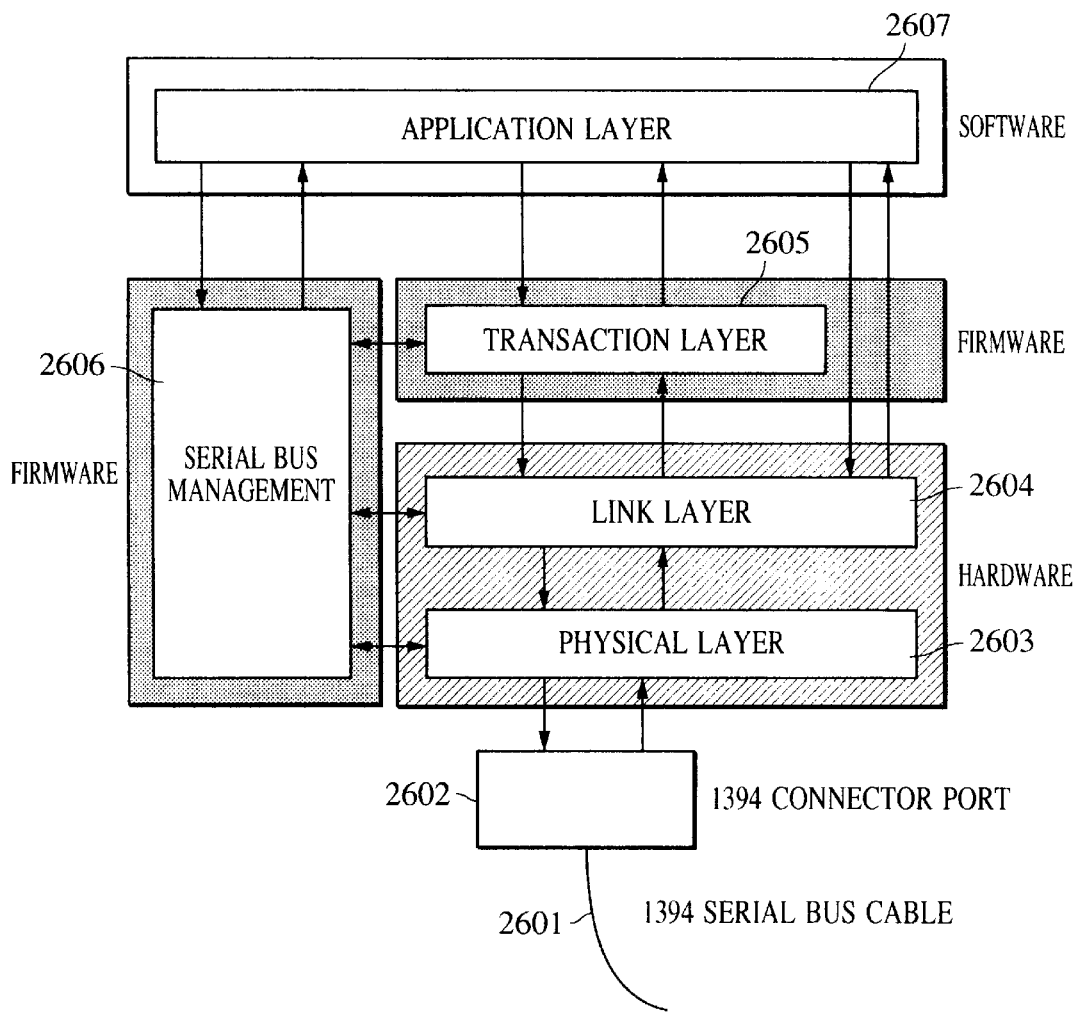
FIG. 26 is a diagram for explaining components of an 1394 interface.

In FIG. 26, the hardware section comprises the physical layer 2603 and a link layer 2604. The physical layer 2603 performs functions of a physical and electrical interface with respect to other nodes, detection of the bus reset and concomitant processing, coding/decoding of input/output signals, arbitration on the right of using the bus, etc. The link layer 2604 performs generation, transmission and reception of communication packets, control of a cycle timer, etc.

Also, in FIG. 26, a firmware section includes a transaction layer 2605 and a serial bus management 2606. The transaction layer 2605 manages the asynchronous transfer mode and provide various transactions (such as read, write and lock). The serial bus management 2606 provides, based on the CSR architecture described later, functions of controlling the node containing these elements (the "own node"), managing a state of connection of the own node, managing ID information of the own node, managing resources of the serious bus network. The hardware section and the firmware section, described above, primarily constitute the 1394 interface, and their basic configurations are specified in the IEEE 1394 Standard.

An application layer 2607 included in a software section depends on the application software used, and controls how data is communicated over the network. In the case of mobile picture data for a digital VTR, for example, the application layer 2607 is specified according to communication protocols such as AV/C protocols.

(3) Address Designation

Figure 27:
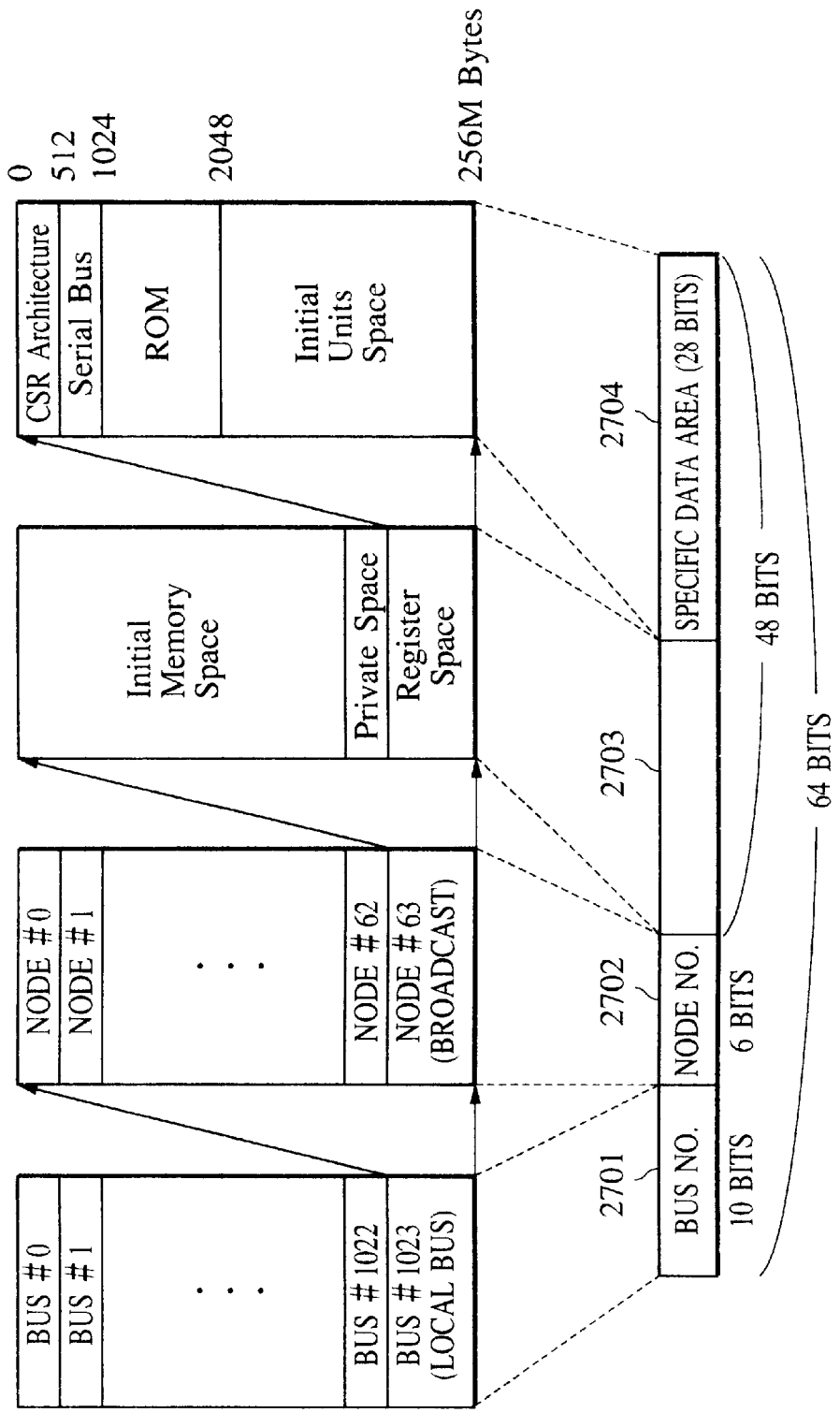
FIG. 27 is a diagram for explaining an address space in the 1394 interface.

FIG. 27 is a diagram for explaining an address space in the 1394 interface. The 1394 interface specifies an address space of 64-bit width according to the CSR (Command and Status Register) in conformity with the IEEE 1394 Standard.

In FIG. 27, a field 2701, of the first 10 bits, is used to set the ID number for designating the predetermined bus, and a field 2702, of the next 6 bits, is used to set the ID number for designating the predetermined device (node). These higher-order 16 bits are called the "node ID", and each node can execute communication with other designated nodes by using the node IDs. A field of the remaining 48 bits is used to designate an address space (256-Mbyte structure) provided in each node. A field 2703 of the first 20 bits of those remaining 48 bits is used to designate a plurality of areas (initial memory space, private space, and register space) which jointly constitute the address space. A field 2704 of the last 28 bits is used to designate addresses for storing information that is common or specific to respective nodes.

(4) Construction of Communication Cable

Figure 28:
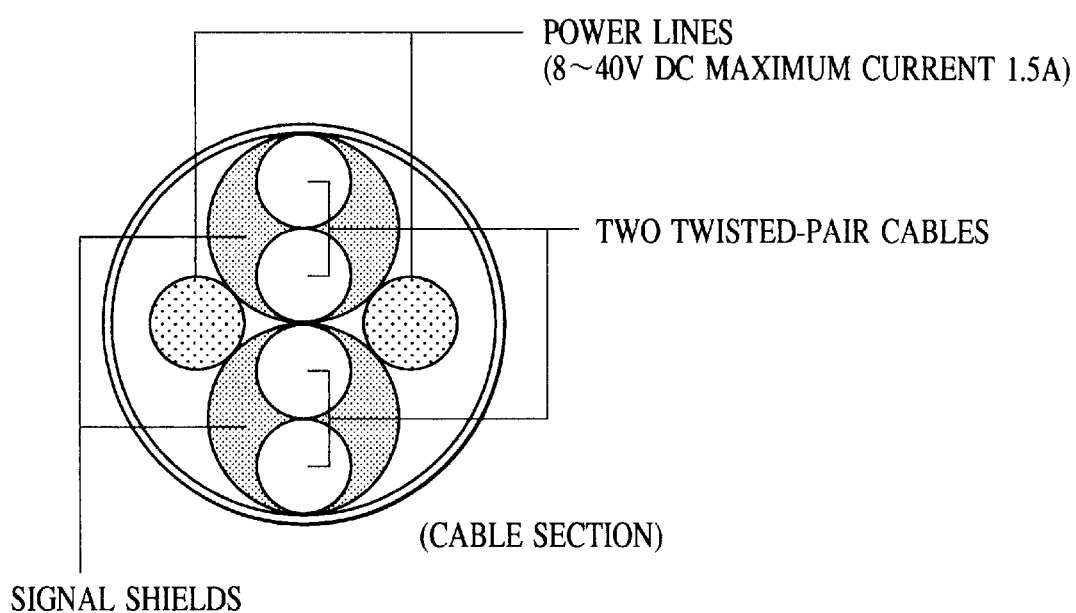
FIG. 28 is a sectional view of a communication cable in conformity with the IEEE 1394 Standard.

FIG. 28 is a sectional view of the communication cable in conformity with the IEEE 1394 Standard.

As shown in FIG. 28, the communication cable is made up of two sets of twisted-pair signal lines and power lines. With the power lines contained in the communication cable, the 1394 interface can supply power to, e.g., even those devices whose main power source is turned off or whose source power has fallen due to a failure. Also, as shown in FIG. 28, the power supplied through the power lines is specified to have a voltage of 8–40 V and a maximum current of DC 1.5 A. Note that some communication cables are of 4-pin type that include no power lines.

(5) DS-Link (Data/Strobe Link) Coding Mode

Figure 29:
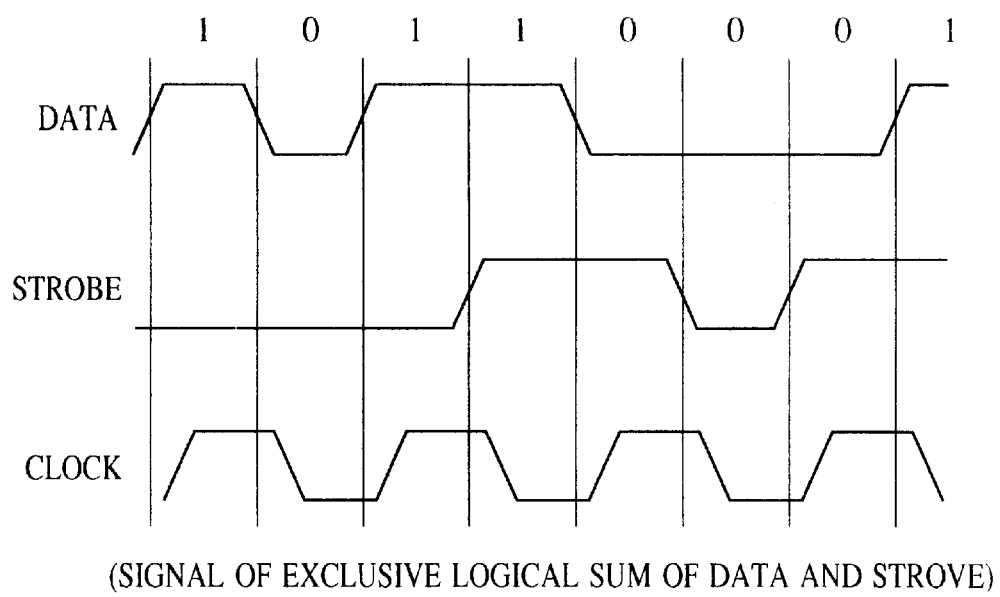
FIG. 29 is a chart for explaining a DS-Link coding mode.

Information signals coded according to the DS-Link (Data/Strobe Link) coding mode are transmitted through the two sets of twisted-pair cables. FIG. 29 is a chart for explaining the DS-Link coding mode.

The DS-Link coding mode is employed in the IEEE 1394-1995 Standard. The DS-Link coding mode is suitable for serial data communication at high speeds, and requires two sets of twisted-pair cables. One set of twisted-pair cables serves to transmit data signals, and the other set of twisted-pair cables serves to transmit strobe signals. The receiving side can reproduce the clock by taking the exclusive logical sum of the data signal and the strobe signal which are received through the two sets of twisted-pair cables.

The 1394 interface can provide the advantages below, for example, by employing the DS-Link coding mode: (1) the DS-Link coding mode has a higher transfer efficiency than other coding modes, (2) a PLL circuit is no longer required and hence the circuit scale of a controller LSI can be reduced, and (3) since there is no need of sending information indicating when the interface is in an idle state, a transceiver circuit can be easily brought into a sleep state and consumption of power can be reduced.

(6) Bus Resetting

The 1394 interface of each node can automatically detect the fact that the connection relation with respect to other nodes has changed. Upon such a detection, the 1394 interface performs the bus resetting in accordance with procedures described below. Note that a change of the connection configuration can be detected from a change of the bias voltage applied to the communication port of each node.

A bus reset signal is transmitted to the bus via the 1394 interface from the node which has detected a change of the connection configuration of the network (e.g., an increase/decrease in the number of nodes resulting from insertion/removal of a node and/or power-on/off of a node), or the node which requires to newly recognize the connection configuration of the network.

The 1394 interface of the node which has received the bus reset signal informs its own link layer 2604 of the occurrence of bus reset, and at the same time transfers the bus reset signal to other nodes. Upon receiving the bus reset signal, each node clears the connection configuration of the network which has been recognized so far, and the node ID which has been assigned to each device. After all nodes have completely detected the bus reset signal, each node automatically executes the initialization concomitant with the bus reset (i.e., recognition of the new connection configuration of the network and assignment of the new node ID).

Data transfer is temporarily interrupted upon the start-up of bus resetting, and is then resumed under the new network after the initialization concomitant with the bus reset. Other than being started up upon a change of the connection configuration as mentioned above, the bus resetting can also be started up when the application layer 2607 issues a command directly to the physical layer 2603 in accordance with control on the host side.

(7) Sequence after Start-up of Bus Resetting

After the start-up of bus resetting, the 1394 interface of each node automatically executes recognition of the new connection configuration and assignment of the new node ID. A general sequence of processing after the start-up of bus resetting to assignment of the node ID will be described below with reference to FIGS. 30 to 33.

Figure 30:
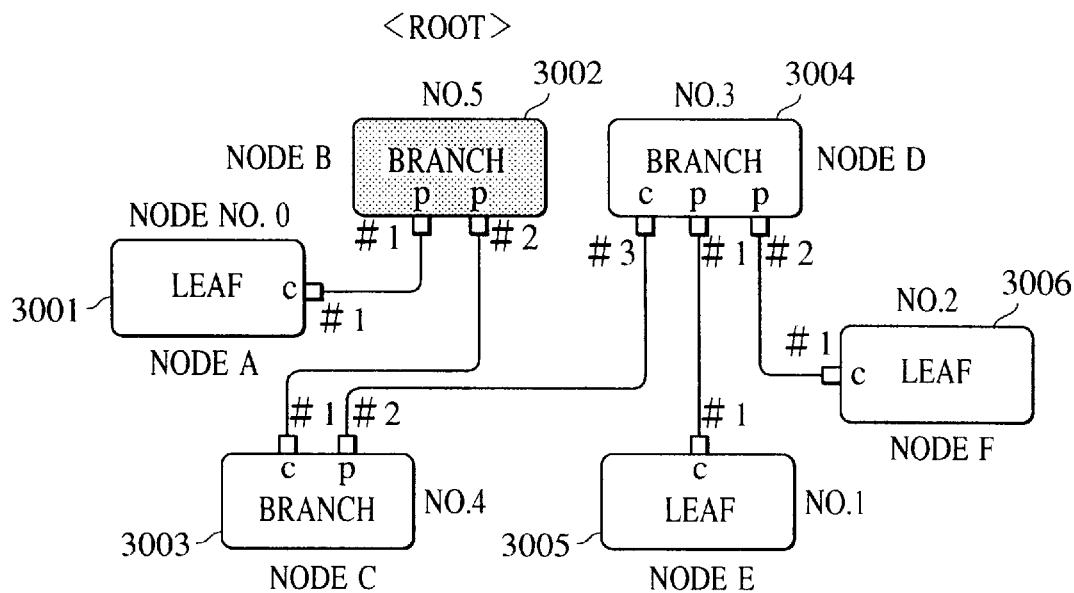
FIG. 30 is a diagram showing one example of a state after the start-up of bus resetting.

FIG. 30 is a diagram showing one example of a state after the start-up of bus resetting in the 1394 network.

In FIG. 30, the nodes A, E and F each have one communication port, the nodes B and C each have two communication ports, and the node D has three communication ports. The communication ports of the nodes are each given with the port number for identification of the ports.

The processing after the start-up of bus resetting to assignment of the node ID in the network of FIG. 30 will now be described with reference to a flowchart of FIG. 31.

Figure 31:
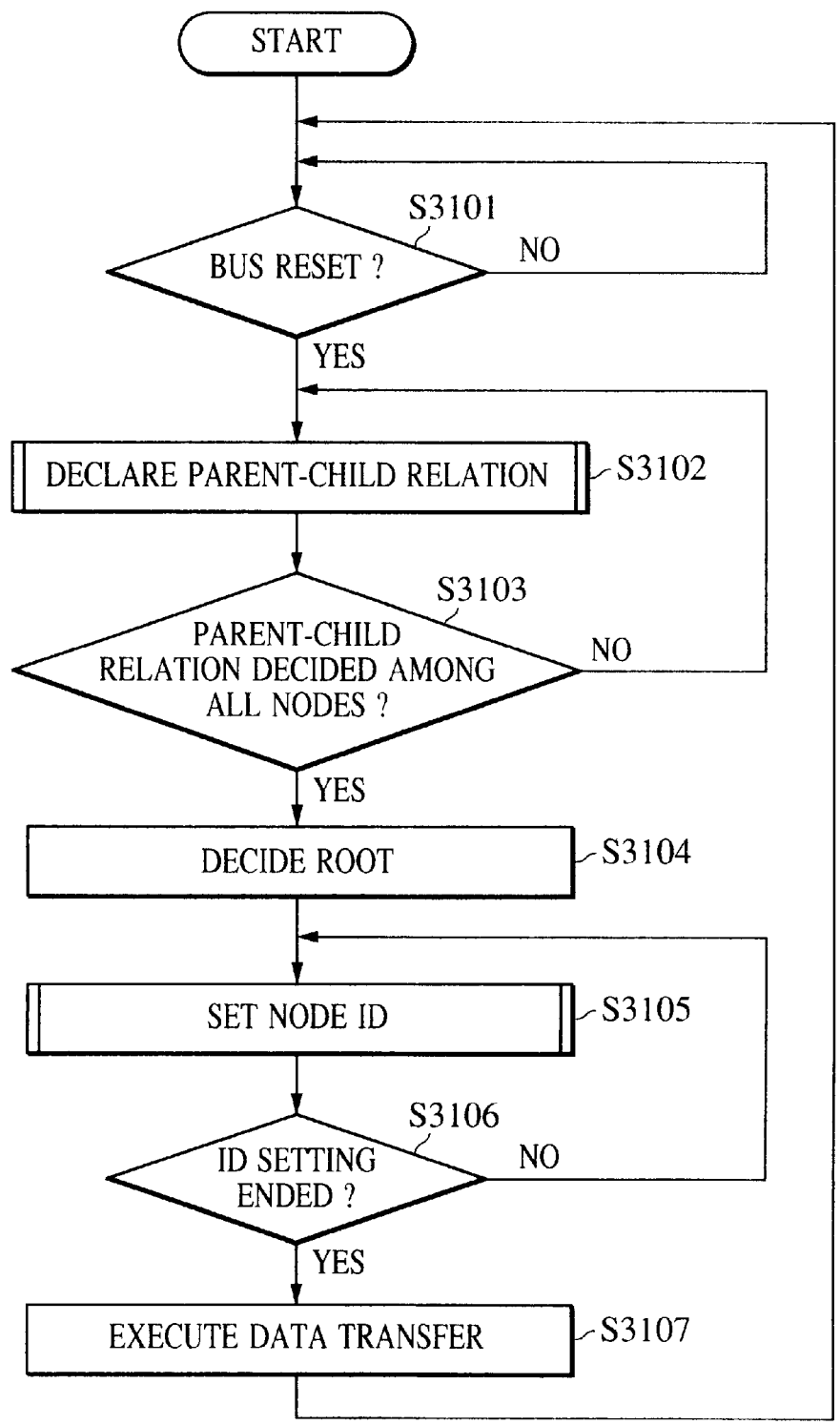
FIG. 31 is a flowchart for explaining the processing from the start-up of bus resetting to assignment of node IDs in the 1394 network.

In FIG. 31, each of the nodes A–F constituting the 1394 network is always monitoring whether a bus reset has occurred (step S3101). If a bus reset signal is output upon a change of the connection configuration, e.g., power-on/off of the node, each node executes processing as follows.

After the occurrence of bus reset, each node declares the parent-child relation between its own communication port and each of the communication ports of other nodes (step S3102).

Each node repeats the processing of step S3102 until the parent-child relations are determined for all the nodes (step S3103).

After the parent-child relations have been decided for all the nodes, the 1394 interface of each node decides the node which performs arbitration of the network, i.e., the root (step S3104).

After deciding the root, the 1394 interfaces of the nodes execute the operation of automatically setting the node IDs different from each other (step S3105).

The root executes the processing of step S3105 in accordance with the predetermined sequence until the node IDs are set for all the nodes (step S3106).

After the node IDs have been completely set for all the nodes, each node executes isochronous transfer or asynchronous transfer (step S3107).

Subsequent to the processing of step S3107, the 1394 interface of each node begins monitoring of the bus reset again. Then, if another bus reset occurs, each node executes the processing from step S3101.

With the sequence described above, each time the bust reset is started up, the 1394 interface of each node can automatically execute recognition of the new connection configuration and assignment of the new node ID.

(8) Decision of Parent-Child Relation

The processing of step S3102 shown in FIG. 31 (i.e., the processing to recognize the parent-child relation between predetermined nodes) will now be described in detail with reference to FIG. 32.

Figure 32:
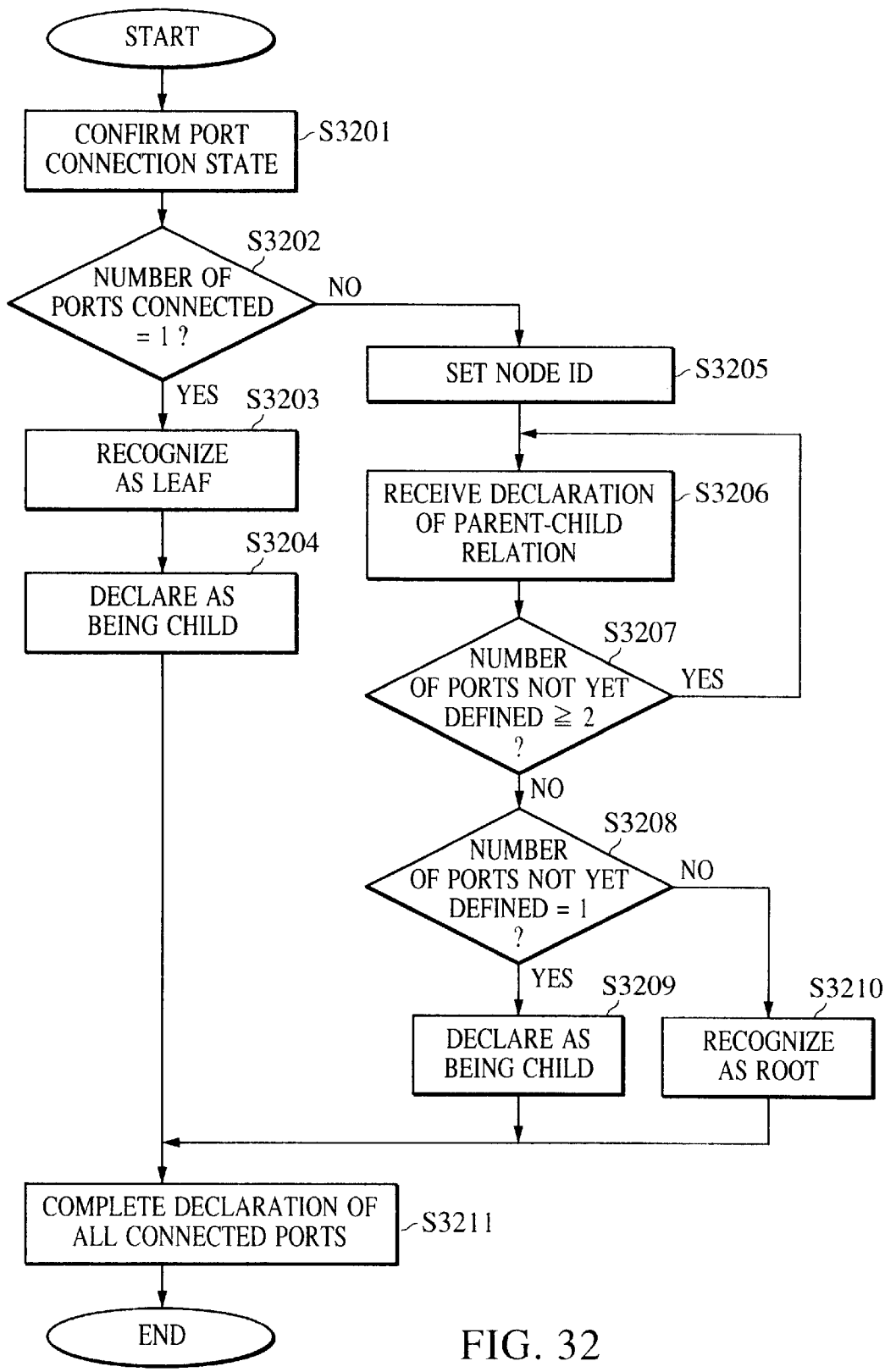
FIG. 32 is a flowchart for explaining in detail the processing of step S3102 in FIG. 31.

In FIG. 32, after the occurrence of bus reset, each of the 1394 interfaces of the nodes A–F confirms a connection state of its own communication port (i.e., whether its own communication port is connected or not) (step S3201).

After confirming a connection state of its own communication port, each node counts the number of communication ports connected to other ports (referred to as "connected ports" hereinafter) (step S3202).

If the number of connected ports is one as a result of the processing of step S3202, the node recognizes that it is a "leaf" (step S3203). Here, the term "leaf" means a node which is connected to exactly one node.

The node serving as a leaf declares to another node, which is connected to its connected port, that "I am a child" (step S3204). At this time, the leaf recognizes that its connected port is a "child port" (i.e., a communication port connected to a "parent port").

Here, declaration of the parent-child relation is first made between a leaf at the end terminal of the network and a branch, and then between branches successively. The parent-child relations between nodes are decided in order starting from the communication port for which the declaration can be made at the earliest time. As between two nodes, a communication port which has declared that it is a child is recognized as being a "child port", and the communication port which has received such a declaration is recognized as being a "parent port" (i.e., a communication port connected to a child port). In FIG. 30, for example, each of the nodes A, E and F declares the parent-child relation after recognizing that it is a leaf. As a result, the parent-child relation is decided between the nodes A and B, between the nodes E and D, and between the nodes F and D.

If the number of connected ports is two or more as a result of the processing of step S3202, the node recognizes that it is a "branch" (step S3205). Here, the term "branch" means a node which is connected to two or more nodes.

A node serving as a branch receives the declaration of the parent-child relation from the node to which its communication port is connected (step S3206). The connected port which has received the declaration is recognized as being a parent port.

After recognizing one communication port as a parent port, the branch detects whether there still remain two or more connected ports for which the parent-child relation has not yet been decided (i.e., ports not yet defined) (step S3207). If there are two or more ports not yet defined as a result of the detection, the branch executes step S3206 again.

If there is only one port not yet defined as a result of the processing of step S3207, the branch recognizes the not-yet-defined port as a child port and declares to the node which is connected to that port, that "I am a child" (steps S3208, S3209).

Here, the branch cannot declare to another node that "I am a child", until the number of ports remaining not yet defined becomes equal to one. In FIG. 30, for example, each of the nodes B, C and D recognizes that it is a branch, and receives the declaration from a leaf or another branch. After deciding the parent-child relation between D and E and between D and F, the node D declares the parent-child relation with respect to the node C. Also, the node C receives the declaration from the node D and then declares the parent-child relation with respect to the node B.

If there is no port not yet defined as a result of the processing of step S3208 (i.e., if all the connected ports of the branch are recognized as parent ports), the branch recognizes that it is a root (step S3210). In FIG. 30, for example, the node B is recognized by other ports as a root, which arbitrates communication over the network.

Although the node B is decided as a root in the illustrated embodiment, another node C may be decided as a root if the node B declares the parent-child relation at an earlier timing than the declaration made by the node C. In other words, depending on the timing of declaration, any port may be decided as a root. Thus, the same node is not always decided as a root even in the same network configuration.

When the parent-child relation is declared for all the connected ports as described above, the 1394 interface of each node can recognize the connection configuration of the network in the form of a hierarchical structure (tree structure) (step S3211). Incidentally, the parent node locates at a higher level in the hierarchical structure and the child node locates at a lower level in the hierarchical structure.

(9) Assignment of Node IDs

Figure 33:
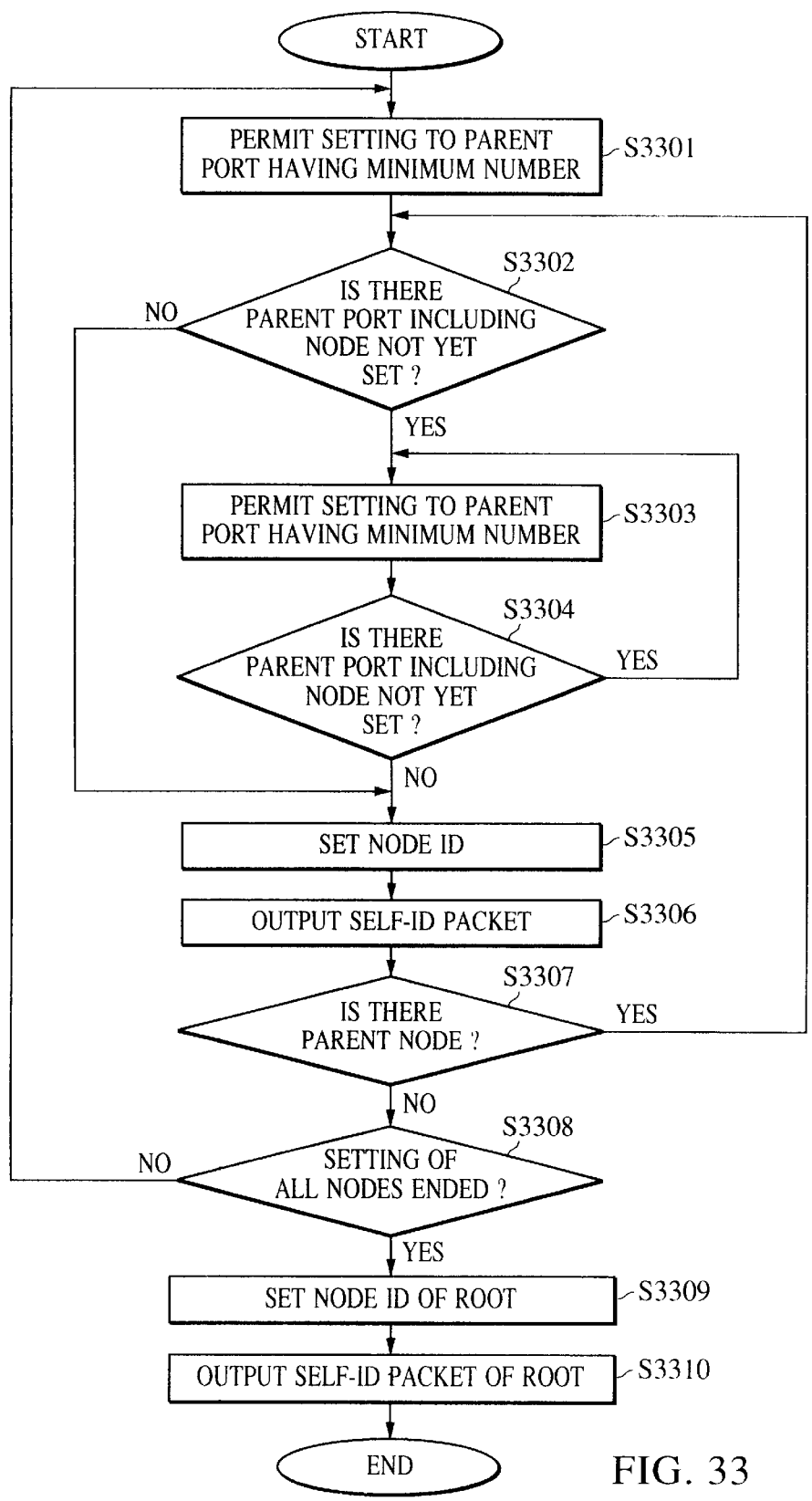
FIG. 33 is a flowchart for explaining in detail the processing of step S3105 in FIG. 31.

FIG. 33 is a flowchart for explaining in detail the processing of step S3105 in FIG. 31 (i.e., the processing to automatically assign the node ID to each node). Here, the node ID consists of the bus number and the node number. It is assumed in this embodiment that all the nodes are connected to the same bus and are assigned with the same bus number.

In FIG. 33, the root detects the parent ports to which the nodes having not ended setting of the node ID are connected directly or indirectly, and permits setting of the node ID to that one of those parent ports which has a minimum (lowest) number (step S3301). Note that, in the processing sequence of FIG. 33, after setting node IDs of all those nodes which are connected directly or indirectly to the parent port having the minimum or lowest number, the root recognizes that parent port as having being set. Then, similar control is performed for the parent node having the next smallest number. After setting for all the nodes connected to the parent ports has been completed, the root carries out setting of its own node ID. The node number included in the node ID is basically assigned as 0, 1, 2 . . . to the leaf and the branch in this order. Accordingly, the root has a maximum node number.

The node which has received permission of setting in step S3301 determines whether any of its own parent ports includes the node for which the node ID is not yet set (step S3302).

If the parent port including the not-yet-set node is detected in step S3302, the node which has received permission of setting gives in turn permission of setting to the node which is directly connected to the detected parent port (step S3303).

After the processing of step S3303, the node which has received permission of setting determines whether any of its own parent ports includes the node for which the node ID is not yet set (step S3304). If the parent port including the not-yet-set node is detected as a result the processing of in step S3304, the node which has received permission of setting executes the processing of step S3303 again.

If the parent port including the not-yet-set node is not detected in step S3302 or S3304, the node which has received permission of setting sets its own node ID (step S3305).

The node which has set its own node ID broadcasts a self-ID packet including the own node number, information relating to a connection state of the communication port, and so on (step S3306). In FIG. 30, for example, the node B, as the root, gives permission of setting to the node A, which is connected to the communication port having the minimum port number "#1". The node A sets its own node ID by assigning the node number "No. 0" to itself. After setting its own node ID, the node A broadcasts a self-ID packet including the set node number. Here, the term "broadcast" means to transfer a communicating packet from some one node to an indefinite number of nodes.

The 1394 interface of each node can recognize the node numbers assigned to other nodes by receiving the self-ID packets. As a result, it is possible for each node to know the node number assigned to itself.

Figure 34:
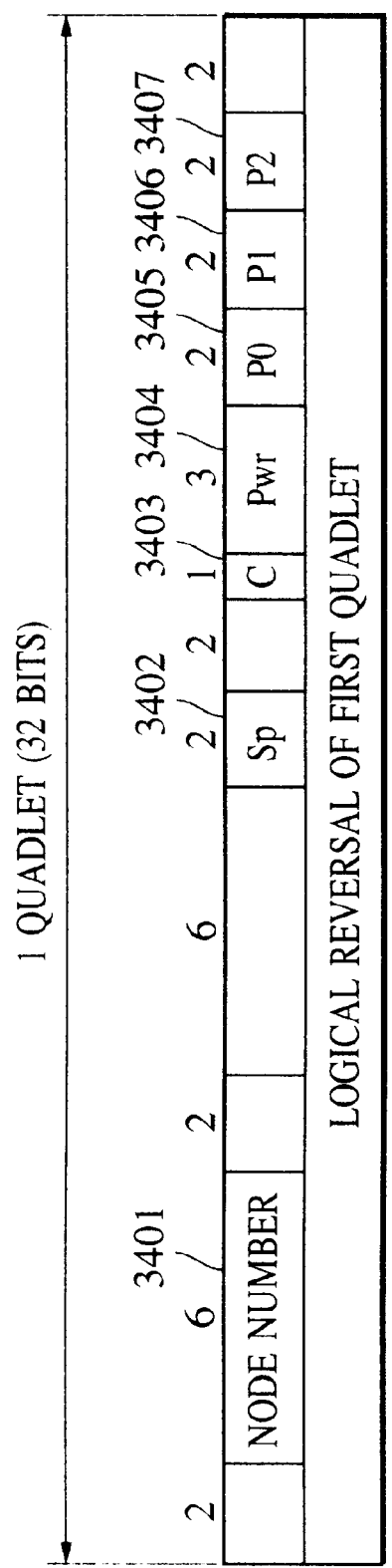
FIG. 34 is a diagram for explaining a configuration of a self-ID packet.

FIG. 34 shows an exemplified configuration of the self-ID packet. In FIG. 34, denoted by 3401 is a field for storing the node number of the node which has broadcasted the self-ID packet, 3402 is a field for storing the information relating to an adaptable transfer speed, 3403 is a field for indicating the presence or absence of a bus managing function (e.g., the presence or absence of capability of a bus manager), and 3404 is a field for storing the information relating to characteristics of power consumption and supply.

Further, in FIG. 34, denoted by 3405 is a field for storing the information relating to a connection state (on whether connected or not yet connected, the parent-child relation of the communication port, etc.) of the communication port having the port number "#0", 3406 is a field for storing the information relating to a connection state (on whether connected or not yet connected, the parent-child relation of the communication port, etc.) of the communication port having the port number "#1", and 3407 is a field for storing the information relating to a connection state (on whether connected or not yet connected, the parent-child relation of the communication port, etc.) of the communication port having the port number "#2". Here, if the node broadcasting the self-ID packet has capability enough for serving as a bus manager, a contender bit indicated by the field 3403 is set to "1", and if not so, the contender bit is set to "0".

The bus manager has functions of managing bus power control information (specifically, information indicating whether power can be supplied via the communication cable, whether power is required to be received, etc.), speed information (specifically, information indicating the transfer speed of each node and the maximum transfer speed between nodes), and information relating to the connection configuration (i.e., topology map information, more specifically information indicating the parent-child relation of each communication port, and whether it is connected or not), and a function of providing the above information to other nodes. With the aid of those functions, the node serving as the bus manager can perform bus management of the entire 1394 network.

After the processing of step S3306, the node which has set the node ID determines whether there is a parent node (step S3307). If there is a parent node, the parent node executes the above-mentioned sequence of processing from step S3302 again to set the node IDs of the leaf and the branch in this order.

If there is no parent node in step S3307, the relevant node is a root. The root determines whether the node IDs have been set for all the nodes connected to its parent ports (step S3308).

If setting of the node IDs for all the nodes is not ended in step S3308, the root gives permission of setting one of the parent ports including the not-yet-set node which has a minimum number (step S3301). After that, the above-mentioned sequence of processing subsequent to step S3302 is executed.

If setting of the node IDs for all the nodes is ended, the root executes assignment of its own node number and setting of its own node ID (step S3309). After setting the own node ID, the root broadcasts a self-ID packet (step S3310).

With the processing described above, the 1394 interface of each node can automatically assign the own-node ID to itself.

In this connection, if there are a plurality of nodes having capability of a bus manager after setting of the node IDs, the node having a maximum node number can serve as a bus manager. Specifically, when the root having a maximum node number in the network has the capability of being a bus manager, the root becomes a bus manager. When the root has no such capability, some other node than the root becomes a bus manager. Which node has become a bus manager can be grasped from the contender bit 3403 in the self-ID packet broadcasted from each node.

(10) Arbitration

Figure 35A:
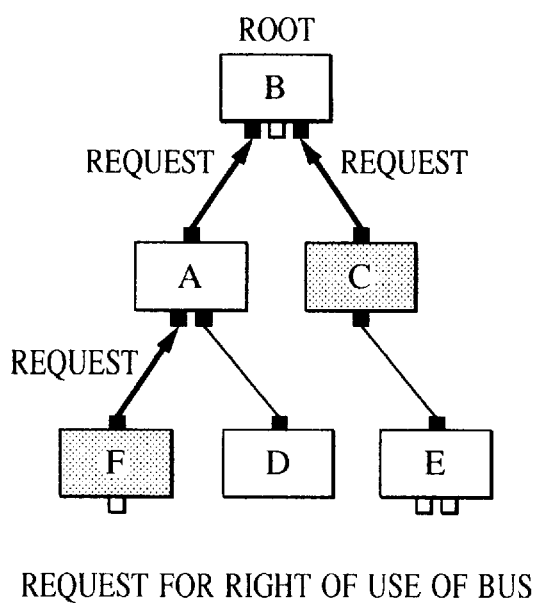
FIGS. 35A and 35B are diagrams for explaining arbitration in the 1394 network.
Figure 35B:
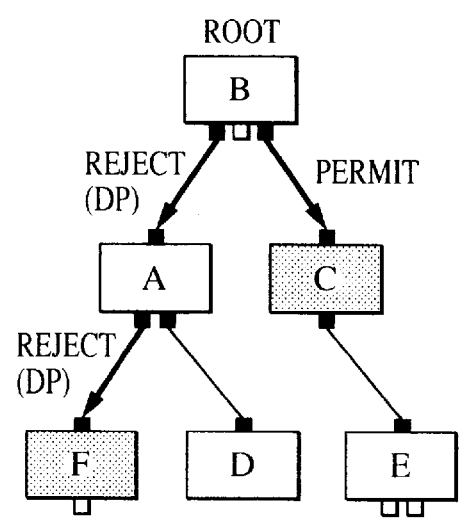

FIGS. 35A and 35B are diagrams for explaining arbitration in the 1394 network.

In the 1394 interface, arbitration on the right of using the bus is always carried out prior to data transfer. Since the 1394 network is a logical bus type network, the 1394 interface of each node can relay a packet transferred from some node to another node. It is hence possible to transfer the same packet to all the nodes of the network. To avoid collision of packets, therefore, arbitration is necessarily required. The arbitration enables only one node to transfer a packet at a time.

FIG. 35A is a diagram for explaining the case where the nodes C and F are requesting the right of using the bus. When arbitration begins, the nodes C and F each issue a request for the right of using the bus to the parent node. The requests are finally transferred to the root (node B) managing the arbitration. For example, when the parent node (node A) receives the request from the node F, it relays the received request for the right of using the bus to its parent node (i.e., the root). The root, having received the requests for the right of using the bus, decides to which node permission to use the bus is given. The arbitration operation can be performed only by the node serving as the root. Permission to use the bus is given to the node which has won the arbitration.

FIG. 35B shows a state where the request from the node C is permitted, but the request from the node F is rejected. A DP (Data Prefix) packet is sent to the node which has lost in the arbitration, thereby informing that node of rejection of the request issued from it. The rejected node holds the request for the right of using the bus until the next arbitration.

By controlling arbitration as described above, the 1394 interface of each node can manage the right of using the bus.

(11) Asynchronous Transfer Mode

The asynchronous transfer mode is a mode of transferring packets in asynchronous relation. The asynchronous transfer mode will be described below with reference to FIG. 36.

Figure 36:
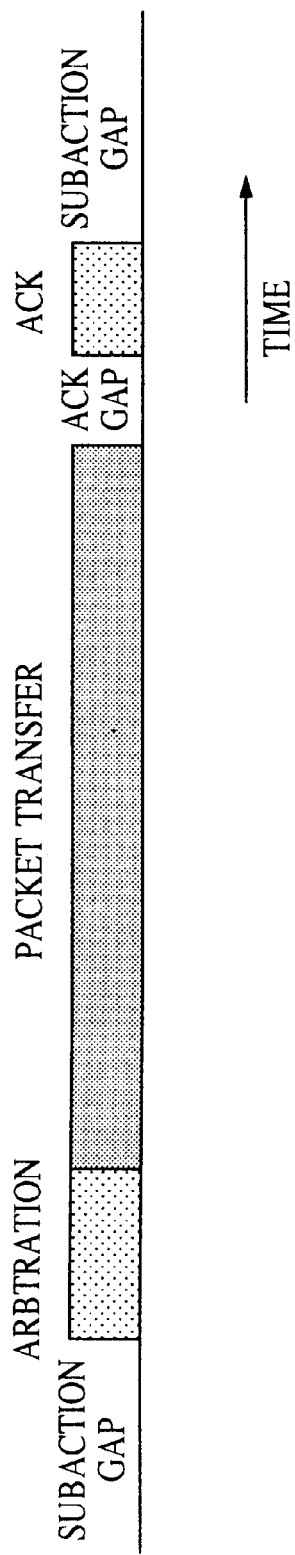
FIG. 36 is a diagram for explaining an asynchronous transfer mode.

In FIG. 36, a first subaction gap represents an idle state of the bus. After an idle time of this gap has reached a certain value, the node desiring to start the asynchronous transfer judges that the bus is usable, and then executes arbitration.

Figure 37:
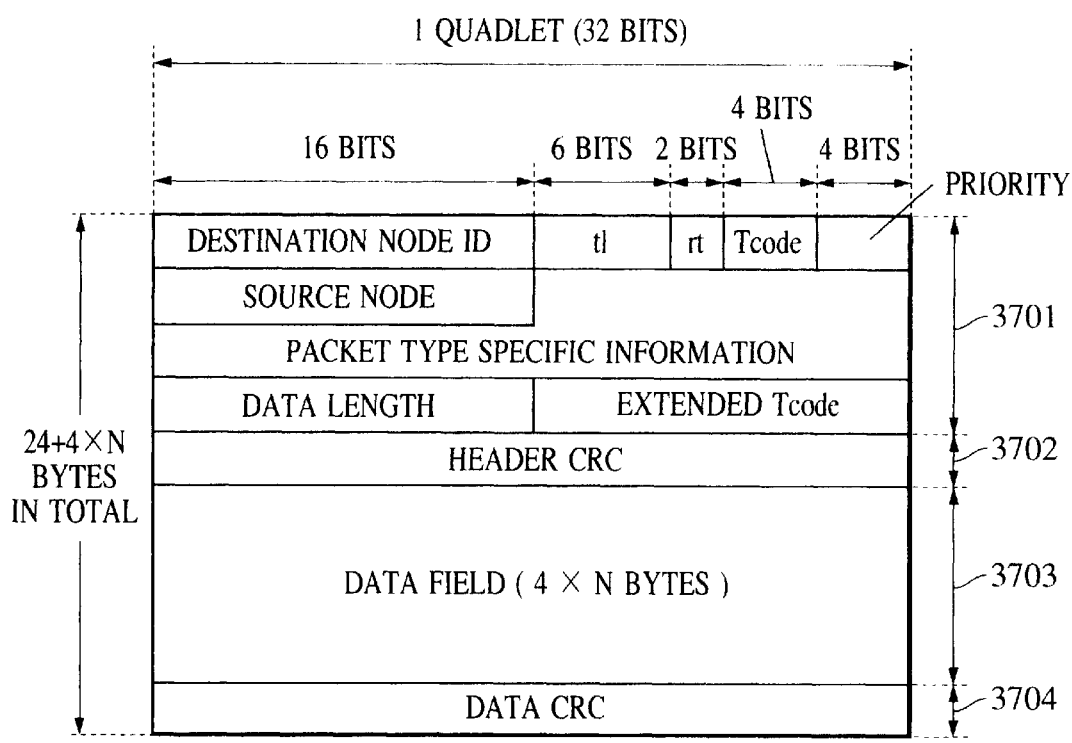
FIG. 37 is a diagram showing the format of an asynchronous packet.

The node which has obtained the right of using the bus as a result of the arbitration transfers a packet, shown in FIG. 37, to a predetermined node. The node having received the packet sends back ACK (return code for acknowledgment) or a response packet after ACK GAP (acknowledgment gap). Here, ACK consists of 4 bits of information (indicating success, busy, pending, etc.) and a 4-bit check sum.

FIG. 37 is a diagram showing the format of a communication packet transferred in accordance with the asynchronous transfer mode. Hereinafter, a communication packet transferred in accordance with the asynchronous transfer mode will be referred to as an "asynchronous packet".

In FIG. 37, the asynchronous packet is made up of a header portion 3701, a header CRC 3702, a data portion 3703, and a data CRC 3704. The header portion 3701 stores information such as the destination node ID, the source node ID, and the length of the data in the data portion 3703.

The asynchronous transfer is one-to-one communication with respect to a designated partner node. Accordingly, a packet transferred from the source node is routed to all the nodes of the network, but each node ignores packets having addresses other than its own address. As a result, only the node designated as the destination can receive and read the corresponding packet.

(12) Isochronous Transfer Mode

The isochronous transfer mode is a mode of transferring packets in synchronous relation. The isochronous transfer mode is a transfer mode suitable for transferring data which requires real-time transfer, in particular, such as mobile picture data and voice data. The isochronous transfer mode is not one-to-one communication like the asynchronous transfer mode, but broadcasting communication. Thus, a packet sent out of some node is transferred to all the nodes of the network. Incidentally, there is no ACK (return code for acknowledgment) in the isochronous transfer.

Figure 38:
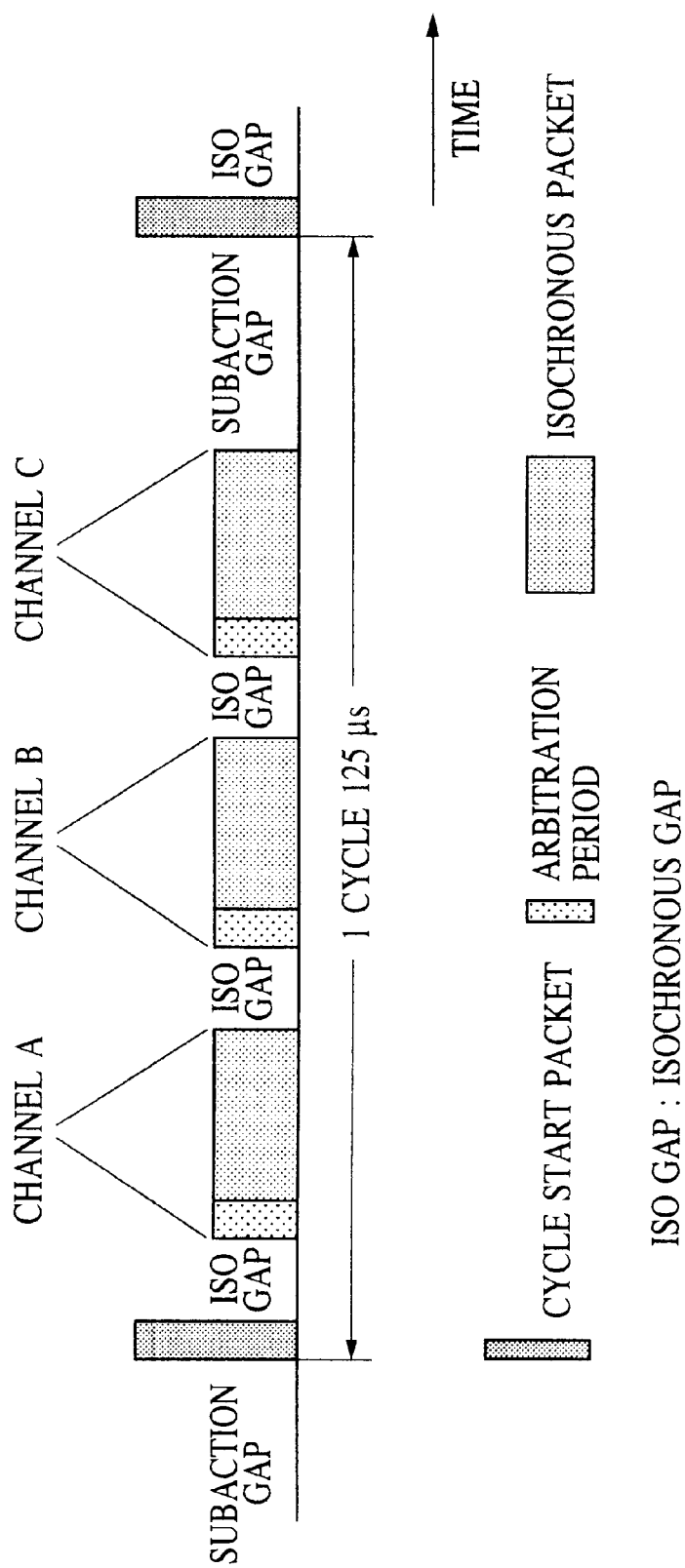
FIG. 38 is a diagram for explaining an isochronous transfer mode.

The isochronous transfer mode will now be described with reference to FIG. 38. In FIG. 38, the isochronous transfer mode is always executed during a period of one communication cycle. The period of one communication cycle is usually 125 μs. Each communication cycle starts with a cycle start packet (CSP) for adjusting the time counted in each node. After transfer of the CSP, arbitration for the isochronous transfer is started through a predetermined idle period (isochronous gap).

Also, in FIG. 38, channels A, B and C each represent a period during which each node carries out the isochronous transfer. To discriminate a plurality of isochronous transfers from each other, the isochronous transfers are given different channel numbers in the 1394 interface. This enables isochronous transfers to be executed among a plurality of nodes. Here, the channel number serves not to specify the destination, but merely to provide the logical number for data.

Figure 39:
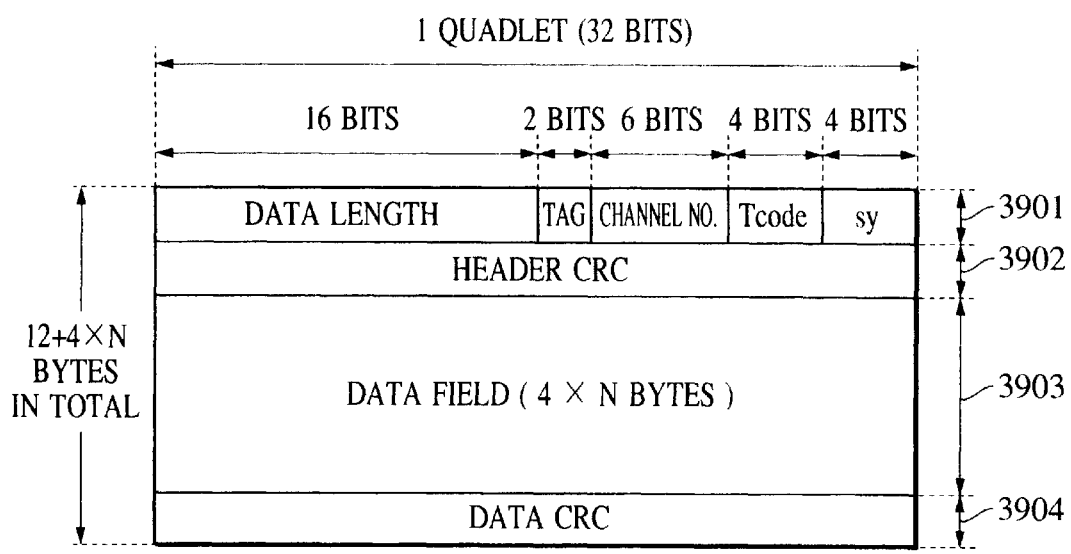
FIG. 39 is a diagram showing the format of an isochronous packet.

FIG. 39 shows the format of a communication packet transferred in accordance with the isochronous transfer mode. Hereinafter, a communication packet transferred in accordance with the isochronous transfer mode will be referred to as "isochronous packet".

In FIG. 39, the isochronous packet is made up of a header portion 3901, a header CRC 3902, a data portion 3903, and a data CRC 3904. The header portion 3901 stores information such as the data length in the data portion 3703, the channel number of the isochronous packet, etc.

(13) Communication Cycle

The isochronous transfer mode and the asynchronous transfer mode can be mixed in each period of communication cycle in a time-sharing manner. The isochronous transfer mode and the asynchronous transfer mode in one communication cycle will be described below with reference to FIG. 40.

Figure 40:
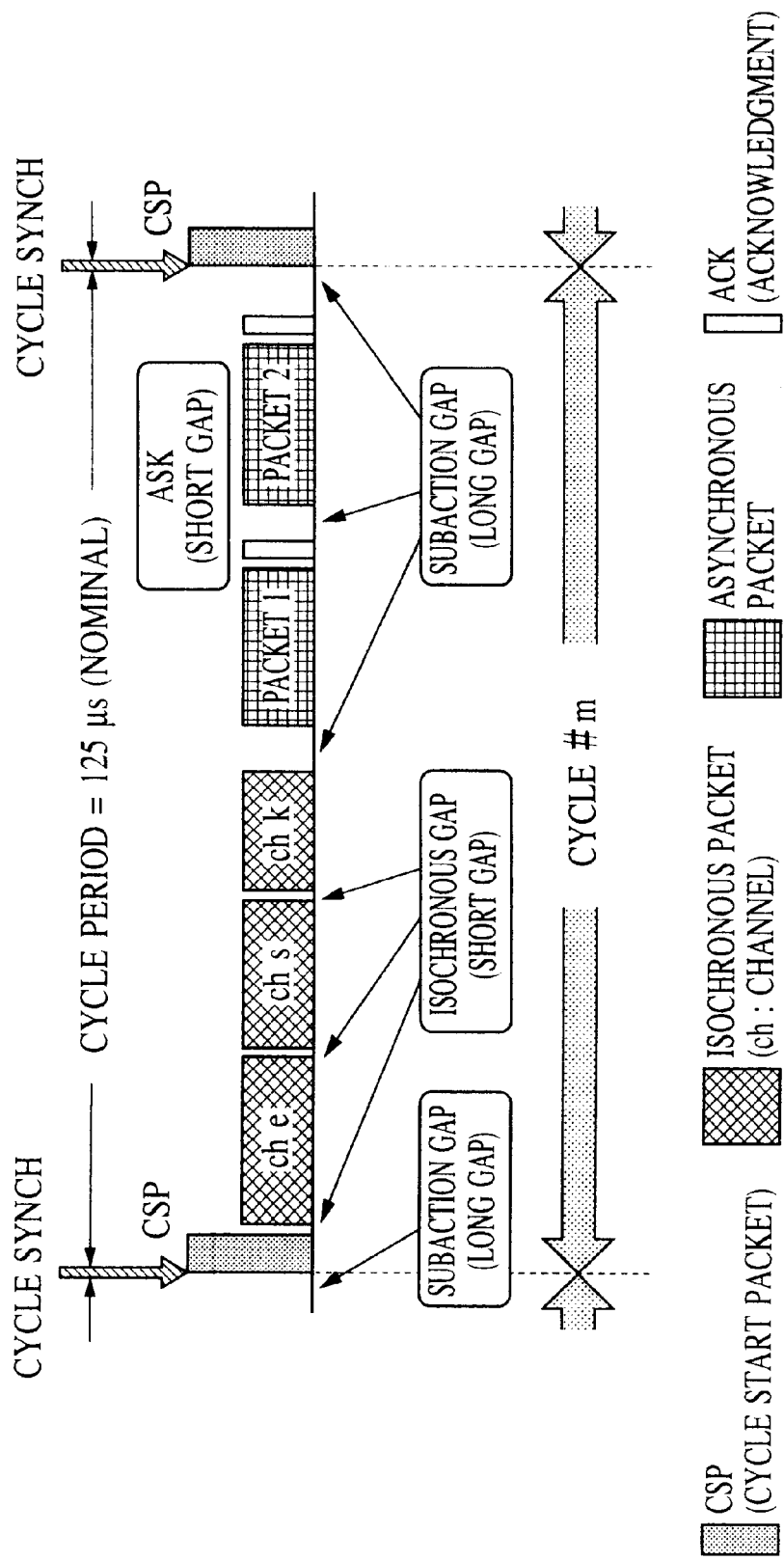
FIG. 40 is a diagram for explaining the isochronous transfer mode and the asynchronous transfer mode in one communication cycle.

In FIG. 40, the isochronous transfer mode is executed in preference to the asynchronous transfer mode. This is because an idle period (subaction gap) required to start up the asynchronous transfer is set to last after the CSP, to be longer than an idle period (isochronous gap) required to start up the isochronous transfer. This setting enables the isochronous transfer to be executed in preference to the asynchronous transfer.

After all those nodes which are able to execute the isochronous transfer have transferred isochronous packets, the 1394 interface of each node can execute the asynchronous transfer. In this respect, the period during which the asynchronous transfer mode can be executed is a period from the end of the isochronous transfer to transfer of the next CSP.

If the time to transfer the next CSP is reached during asynchronous transfer, the asynchronous transfer mode is not forcibly interrupted, and the next CSP is transmitted after the end of the running transfer. When one communication cycle continues over 125 μs, like such a case, the period of next communication cycle is shortened correspondingly. Thus, the 1394 interface of each node can maintain, on average, a substantially constant communication cycle.

The foregoing is a description on the configuration and basic functions of the 1394 interface.

Figure 2:
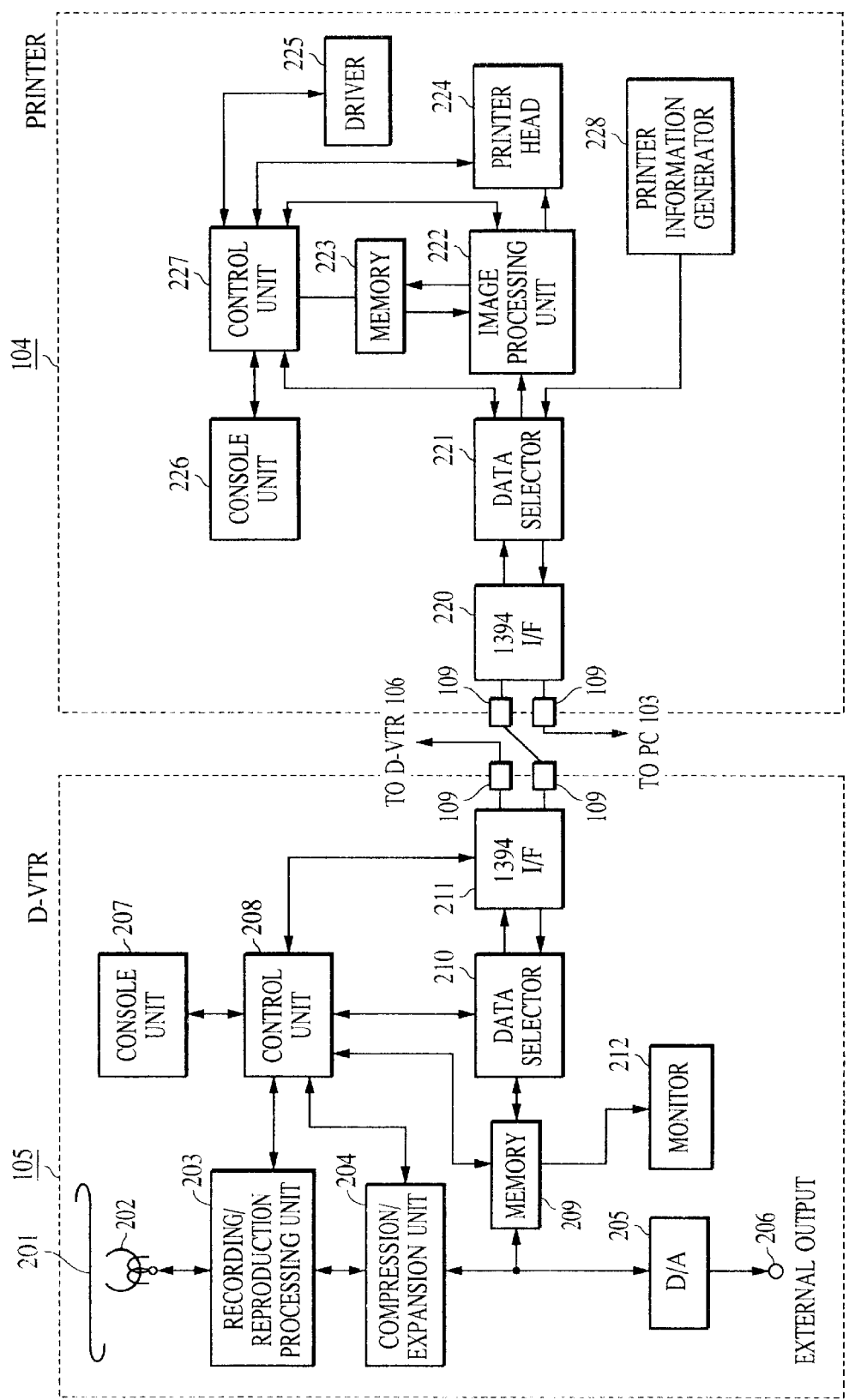
FIG. 2 is a block diagram showing configurations of a printer and a D-VTR.

Next, one example of communication implemented in the communication system according to this embodiment will be described with reference to FIG. 2. FIG. 2 is a block diagram for explaining detailed configurations of the printer 104 and the first stationary digital VTR (D-VTR) 105. The printer 104 and the D-VTR 105 are constructed so as to communicate directly with each other by using predetermined communication protocols (transfer protocols for mobile or still pictures).

In the D-VTR 105 of FIG. 2, denoted by 201 is a recording medium such as a magnetic tape, 202 is a magnetic head for recording/reproduction, 203 is a recording/reproduction processing unit for recording and reproducing data which has been compressed and coded in accordance with a predetermined recording format, 204 is a compression/expansion processing unit for compression-coding or expansion-decoding data in accordance with the predetermined recording format, 205 is a D/A converter, 206 is an external output terminal, 206 is a console for supplying, to a control unit 208, instructions entered by users through a panel, buttons or the like, 208 is a control unit including a microcomputer and controlling the operation of components of the D-VTR 105, 209 is a memory capable of recording image data of multiple frames, and 210 is a data selector for managing input/output of data between a 1394 interface 211 and the memory 209.

Further, in the D-VTR 105 of FIG. 2, denoted by 211 is an 1394 interface incorporated in the D-VTR 105, and 212 is a monitor, e.g., a liquid crystal monitor, for converting image data, read out of the memory 209, into image signals in conformity with the standard television mode (e.g., NTSC or PAL mode) for visual presentation to users.

In the printer 104 of FIG. 2, denoted by 220 is a 1394 interface like that incorporated in the D-VTR 105, and 221 is a data selector for managing input/output of data between the 1394 interface 220 and other processing components. Denoted by 222 is an image processing unit for generating image data for printing, 223 is a memory for temporarily storing data processed by the image processing unit 222, 224 is a printer head, 225 is a driver for controlling the operation of the printer head 224 and a paper feed mechanism, and 226 is a console for supplying, to a control unit 227, instructions entered by users through a panel, buttons or the like. The console 226 can instruct paper feed, reset, confirmation of the amount of expendable supplies (such as ink, toner and paper) remaining, and confirmation of an operating state of the printer (such as standby/stop), and then display the confirmed results on the monitor.

Further, in the printer 104 of FIG. 2, denoted by 227 is a control unit including a microcomputer and controlling the operation of components of the printer 104, and 228 is a printer information generator for generating printer information indicating an operating state of the printer. The printer information is sent, as needed, to other devices in the asynchronous transfer mode.

The processing to print out image data reproduced by the D-VTR 105 by using the printer 104 will be described below.

When reproduction of image data is instructed, the D-VTR 105 reads data in the desired recording format from the magnetic tape 201, and supplies the read data to the recording/reproduction processing unit 203. After performing an error correcting process, etc. on the reproduced data, the recording/reproduction processing unit 203 supplies it to the compression/expansion processing unit 204.

The compression/expansion processing unit 204 performs a predetermined expanding/decoding process on compressed and coded data in a predetermined unit (e.g., image data compressed and coded data in one frame unit) that is contained in the reproduced data. For example, the compression/expansion processing unit 204 performs a compressing/coding process which executes VLC (variable length coding) after DCT (discrete cosine transform), and also performs an expanding/decoding process corresponding to that compressing/coding process.

The image data expanded and decoded by the compression/expansion processing unit 204 is temporarily stored in the memory 209 and then supplied to the monitor 212 in units of one frame. The monitor 212 converts the image data from the memory 209 into image signals in conformity with the standard television mode (e.g., NTSC or PAL mode) for visual presentation to users.

The user operates the console 207 while looking at an image displayed on the monitor 212, thereby to instruct selection and printing of a desired still image. After printing of the selected still image is instructed, the control unit 208 of the D-VTR 105 previously informs the printer 104 of the still image data being transferred in accordance with the predetermined communication protocol. Then, the control unit 208 controls to supply the still image data stored in the frame memory 209 to the 1394 interface 211 via the data selector 210.

The 1394 interface 211 packetizes the input image data into an isochronous packet containing a certain amount of data in accordance with the isochronous transfer mode. Each packet is transferred for each communication cycle in accordance with the predetermined communication protocol.

The 1394 interface 220 of the printer 104 receives the isochronous packet transferred from the D-VTR 105 for each communication cycle. The certain amount of image data contained in the received packet is successively supplied to the image processing unit 222 via the data selector 211.

The image processing unit 222 stores the certain amount of image data successively in the memory 223. Further, the image processing unit 222 converts the image data into print data for a printed image by using the memory 223. The print data produced by the image processing unit 222 is printed by the driver 225 under control of the control unit 227.

With the operation described above, the printer 104 in this embodiment can receive and print the still image data, which is sent from the D-VTR 105 in the isochronous transfer mode, without resorting to the PC 103.

While, in the above-described embodiment, image data not compressed is transferred to the printer 104 in the isochronous transfer mode, it is also possible to provide an expanding/coding circuit in the printer 104 and transfer compressed still image data to the printer 104 in the asynchronous transfer mode.

(First Embodiment)

In a conventional communication system, when users desire to connect a new electronic device to a network, the users are required to check a vacant state of each port of the device constituting the network and to find out for themselves a terminal device capable of being connected additionally. To overcome such a drawback, this first embodiment provides a management described below. The management according to this embodiment has functions of automatically reprieving a terminal device of the network, automatically confirming a vacant state of each port of the terminal device, and informing the user, as needed, of the retrieved result and the confirmed result. One example of configuration of the management (PC 103) for managing the communication system according to this embodiment will be described below with reference to FIG. 3. Note that, in this embodiment, such a device as having one or more vacant ports and being connectable to a new device is referred to simply as "terminal device".

Figure 3:
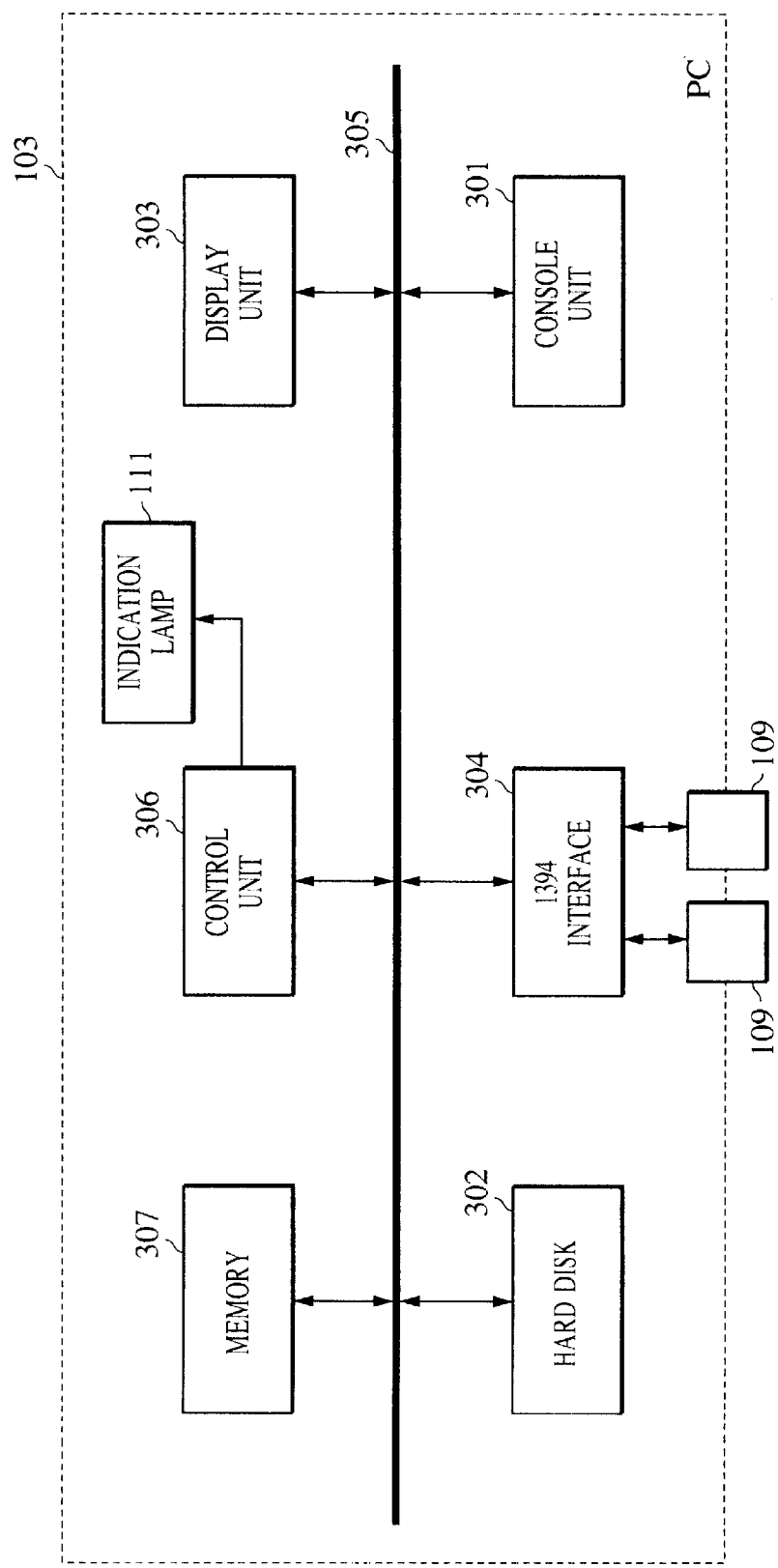
FIG. 3 is a block diagram for explaining an exemplified configuration of a management unit (PC) in this embodiment.

In FIG. 3, denoted by 301 is a console such as a keyboard and a mouse, for example, through which users enter instructions, and 302 is a built-in hard disk for storing, e.g., application software (referred to as terminal retrieval application) to automatically retrieve a terminal device of a communication system and a vacant state of each port of the terminal device, and as needed, to inform users of the retrieved results. At least one application software is installed in the hard disk 302 in this embodiment.

Denoted by 303 is a display unit comprising a liquid crystal monitor or CRT, and being able to display image information, voice information, text information, etc. Denoted by 304 is a 1394 interface having the basic functions described above. Here, the 1394 interface 304 has two communication ports 109 and is connected to other electronic devices via a serial bus cable 110.

Denoted by 305 is an internal data bus for connection of the components (301–307) of the PC 103, and 306 is a control unit including a microprocessor and controlling processing such as generation and calculation of various data. The control unit 306 also controls the operation of the components of the PC 103. Denoted by 307 is a memory for temporarily storing data used in various operations of processing.

Figure 4:
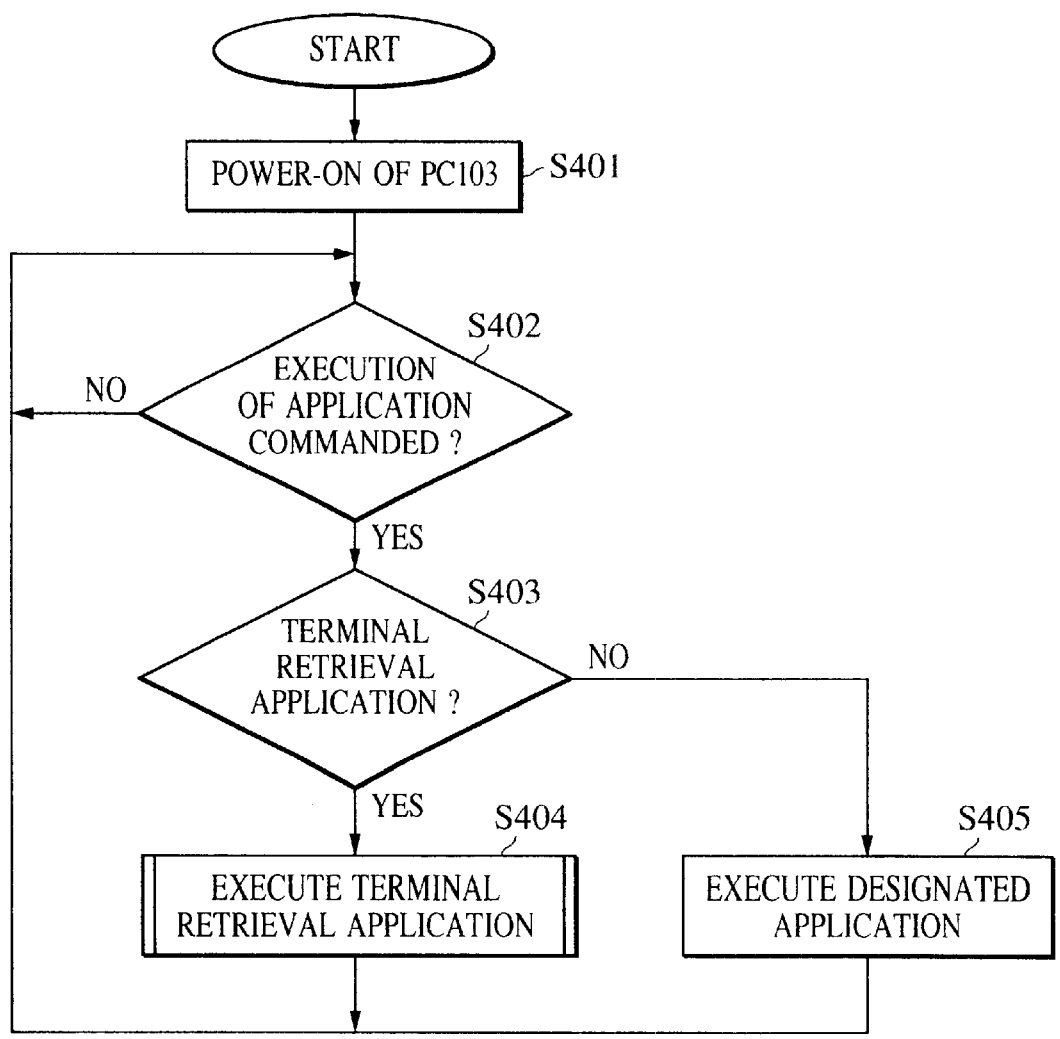
FIG. 4 is a flowchart for explaining the processing operation up to execution of a terminal retrieval application by the PC.

FIG. 4 is a flowchart for explaining the processing operation up to execution of the terminal retrieval application by the PC 103.

In FIG. 4, after power-on, the control unit 306 of the PC 103 detects start-enable applications (including the terminal retrieval application) which are stored in the hard disk 302. Then, the control unit 306 generates icons representing those applications and displays them on the display unit 303 (step S401). After displaying the icons on the display unit 303, the control unit 306 holds itself in a state searching a command to execute any application (step S402).

When the user instructs execution of any of the stored applications from the console 301, the control unit 306 starts up the instructed application (step S403). If the terminal retrieval application is started up in step S403, the control unit 306 can execute processing based on the terminal retrieval application (step S404). If another application is started up, the control unit 306 can execute that application likewise, followed by holding itself again in a state searching for a command to execute any other application (step S405).

Figure 5:
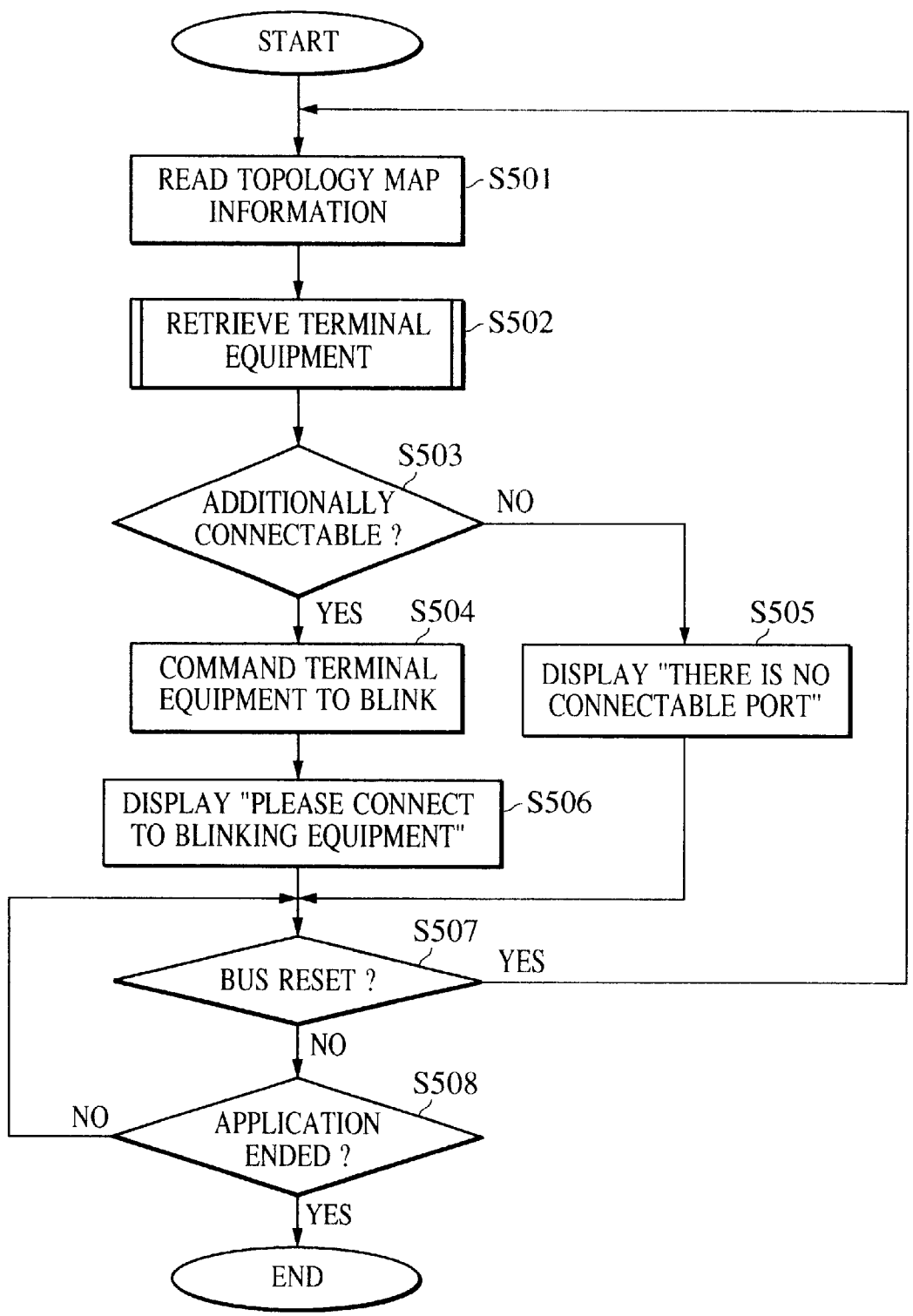
FIG. 5 is a flowchart for explaining the processing of the terminal retrieval application in the first embodiment.

FIG. 5 is a flowchart for explaining the detailed processing of the terminal retrieval application executed in above step S404.

In response to an instruction from the terminal retrieval application, the 1394 interface 304 of the PC 103 communicates with the device which has the function of the above-mentioned bus manager in the communication system of FIG. 1. Then, the 1394 interface 304 reads the topology map information stored in that device to obtain the information relating to the connection configuration of the communication system (step S501).

Based on the topology map information obtained from the bus manager, the control unit 306 of the PC 103 retrieves the terminal device of the communication system (step S502). The processing executed in step 502 to retrieve the terminal device, for which additional connection is allowed, will be described in detail with reference to FIG. 6.

Figure 6:
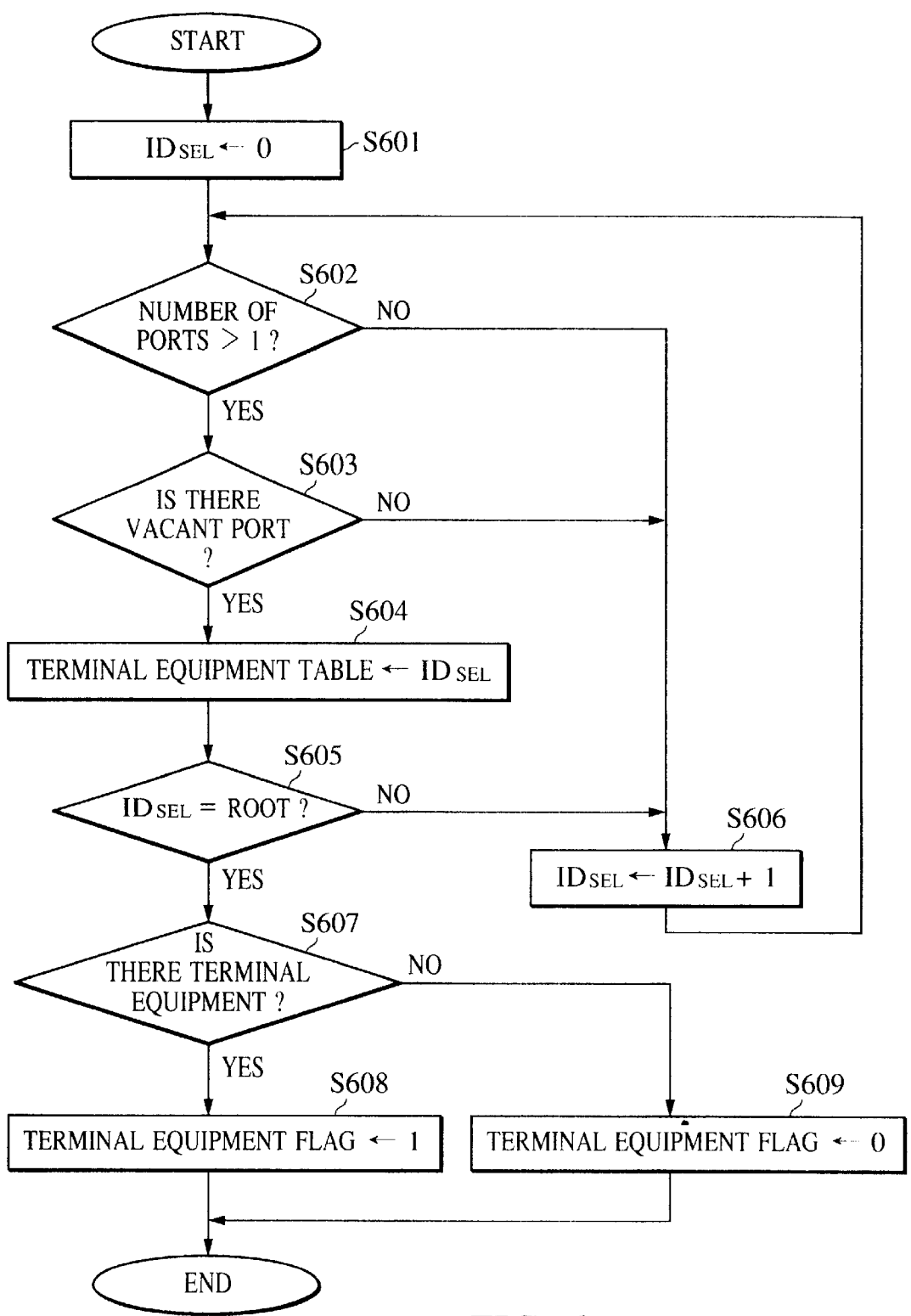
FIG. 6 is a flowchart for explaining in detail the processing of step S502 of the terminal retrieval application in the first embodiment.

In FIG. 6, the terminal retrieval application first loads an initial value "0" in a register $ID_{SEL}$ which stores the node number of the checked node in successive order (step S601). Then, the terminal retrieval application detects the number of communication ports of the node, which corresponds to the value of the register $ID_{SEL}$, from the topology map information (step S602). If the number of communication ports of the relevant node is not larger than "1" as a result of step S602, the terminal retrieval application determines that additional connection to the relevant node is not allowed. The terminal retrieval application then increments the value of the register $ID_{SEL}$ by one (step S606).

If the number of communication ports of the relevant node is larger than "1" as a result of step S602, the terminal retrieval application detects from the topology map information whether the relevant node has a vacant port allowing additional connection (step S603). If there is no vacant port in the relevant node as a result of step S603, a new device cannot be connected to the relevant node. Therefore, the terminal retrieval application increments the value of the register $ID_{SEL}$ by one and then checks the next node (step S606).

If there is a vacant port in the relevant node as a result of step S603, the terminal retrieval application determines that the relevant device is a terminal device. Then, the terminal retrieval application loads the node ID and the number of vacant ports of the node corresponding to the value of the register $ID_{SEL}$ in a terminal device table which is stored in the memory 307.

The terminal retrieval application compares the value of the register $ID_{SEL}$ with the node number of the root to confirm whether the retrieval processing has been completed for all the nodes (step S605). If the value of the register $ID_{SEL}$ is smaller than the node number of the root as a result of step S605, the terminal retrieval application determines that the retrieval processing has not been completed for all the nodes, and then increments the value of the register $ID_{SEL}$ by one (step S606).

If the value of the register $ID_{SEL}$ is not smaller than the node number of the root as a result of step S605, the terminal retrieval application determines that the retrieval processing has been completed for all the nodes, and then checks the contents of the terminal device table to detect whether the terminal device is stored (step S607). If there is stored the terminal device as a result of step S607, the terminal retrieval application sets a terminal device flag to "1" (step S608). If there is stored no terminal device, the terminal retrieval application sets the terminal device flag to "0" (step S609). After the completion of the processing of step S608 or S609, the terminal retrieval application comes to the end of the processing to retrieve the terminal device (i.e., the processing of step S502).

After the processing of step S502, the terminal retrieval application determines from the contents of the terminal device flag whether a new device can be additionally connected (step S503). If the terminal device flag is "0", the terminal retrieval application instructs display of a message, e.g., "There is no connectable port", on the display unit 303 of the PC 103 (step S505). If the terminal device flag is "1", the terminal retrieval application instructs the device, which corresponds to the node ID stored in the terminal device table, to blink or illuminate (step S504), and at the same time instructs display of a message, e.g., "Please connect to a blinking device", on the display unit 303 of the PC 103 (step S506).

After the processing of step S505 or S506, the terminal retrieval application detects whether the above-mentioned bus reset has occurred on the communication system (step S507).

If the bus reset has occurred, the communication system of this embodiment executes the processing to re-recognize the connection configuration, and then updates the information relating to the connection configuration of the communication system (i.e., the topology map information) based on the obtained data. Thus, when the occurrence of bus reset is detected, the terminal retrieval application performs the processing to re-recognize the connection configuration and to communicate with the device serving as the bus manager again. After that, the terminal retrieval application reads the topology map information stored in that device, and executes the sequence of processing from step S502.

If the occurrence of bus reset is not detected, the terminal retrieval application executes the processing of step S507 until a command instructing the end of that application is input. Upon the command being input (step S508), the terminal retrieval application is ended.

By executing the sequence of processing described above, the PC 103 can not only automatically retrieve an identification of the terminal device for which additional connection is allowed, but can also provide users with visual notification of the retrieval information as needed. Consequently, users can easily recognize the communication port to which a new device is connectable.

While the PC 103 is described in this embodiment as being different from the device serving as the bus manager, the PC 103 itself may serve as the bus manager. In such a case, communication between the PC 103 and the bus manager is eliminated and hence more efficient processing can be realized.

(Second Embodiment)

In a second embodiment, another example of the terminal retrieval application modified from that in the above first embodiment is employed.

The terminal retrieval application used in the above first embodiment retrieves the identification of the terminal device based on the topology map information under management of the bus manager. The retrieval result is then indicated by the indication lamp 111 provided on each device.

In some cases, however, the PC 103 has a function of managing, in addition to the topology map information, device information of individual terminal devices (e.g., the device names and model information of the printer, the D-VTR, the CD, etc.) in corresponding relation to their node IDs. The terminal retrieval application according to the second embodiment can display the device information of individual terminal devices as well on the display unit 303.

With the inclusion of such processing, the terminal retrieval application according to the second embodiment can more easily notify users of the device for which additional connection is allowed. Here, the device information is stored in respective registers provided in the individual terminal devices. Each device is constructed to transfer the contents of its own register in response to a request from the supervising unit (PC 103).

The processing operation of the terminal retrieval application according to the second embodiment will be described below with reference to FIG. 7.

In response to an instruction from the terminal retrieval application, the PC 103 communicates with the above-mentioned bus manager and reads the topology map information stored in the bus manager to obtain the information relating to the connection configuration of the communication system (step S701).

Based on the topology map information obtained from the bus manager, the control unit 306 of the PC 103 retrieves the terminal device of the communication system (step S702). In step S702, processing is executed in a like manner to that shown in FIG. 6 to form the terminal device table and the terminal device flag. The terminal device table stores the node ID of the node for which additional connection is allowed, and the number of vacant ports thereof.

After the processing of step S702, the terminal retrieval application determines from the contents of the terminal device flag whether a new device can be additionally connected (step S703). If the terminal device flag is "0", the terminal retrieval application instructs display of a message, e.g., "There is no connectable port", on the display unit 303 of the PC 103 (step S705).

If the terminal device flag is "1", the terminal retrieval application requests the device information from the device corresponding to the node ID which is stored in the terminal device table. The device information obtained from the individual devices in response to the request is stored in the terminal device table along with the node IDs (step S704).

The processing of above step S704 will be described below in detail with reference to a flowchart of FIG. 8.

Figure 8:
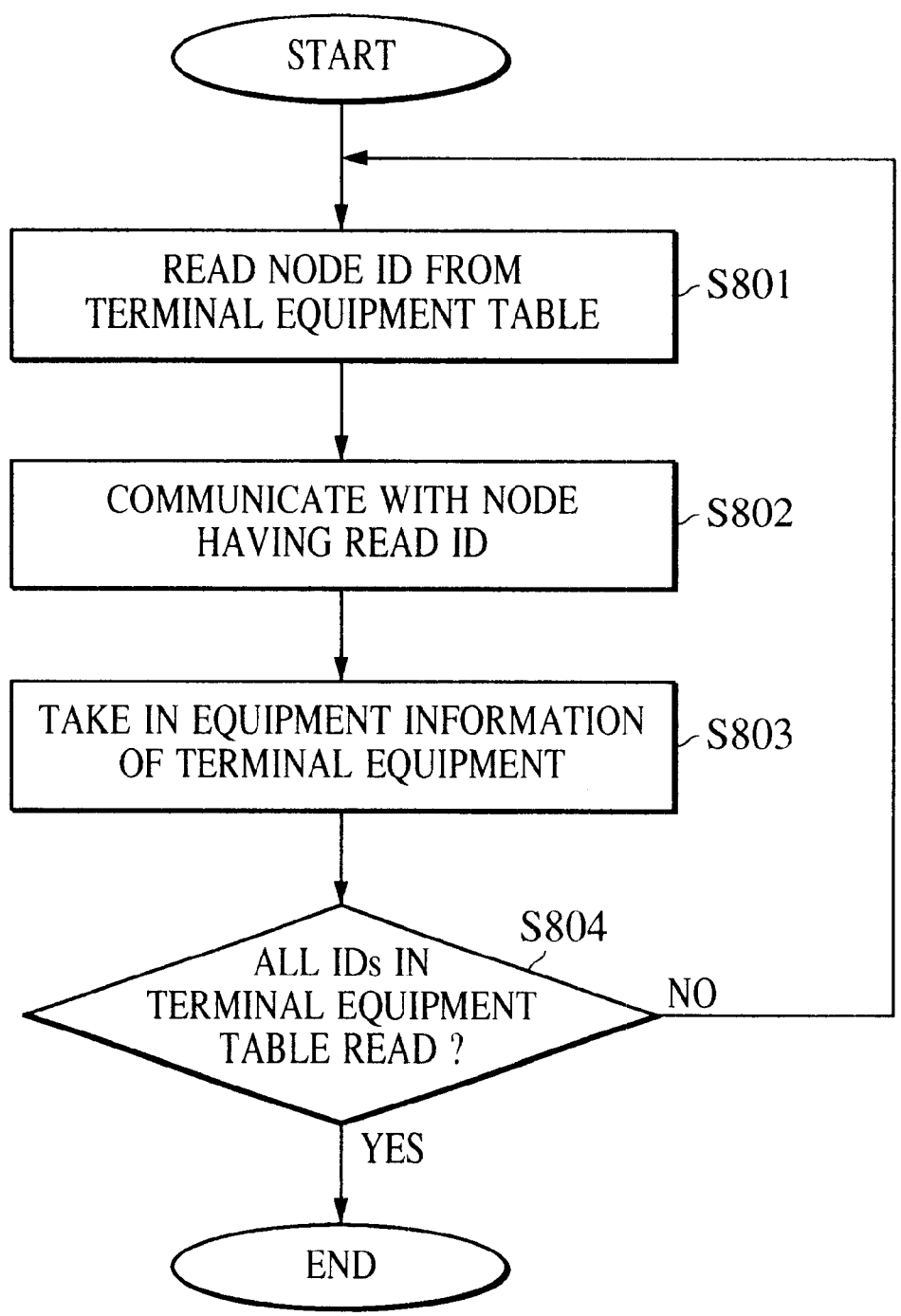
FIG. 8 is a flowchart for explaining in detail the processing of step S704 of the terminal retrieval application in the second embodiment.

In FIG. 8, the terminal retrieval application reads each node ID stored in the terminal device table (step S801). After the processing of step S801, the terminal retrieval application communicates with the device having the read node ID and requests the device information (such as the device name, model information, maker information, and type number) of that device (step S802). Then, the terminal retrieval application loads the device information that is sent back in response to the request in the terminal device table in corresponding relation to the node ID (step S803). After the processing of step S803, the terminal retrieval application detects whether the device information of individual devices has been taken in for all the node IDs stored in the terminal device table. If not so, the terminal retrieval application executes the sequence of processing from step S801 again. If the device information has been taken in for all the node IDs, the processing of step S704 is ended.

After the processing of step S704, the terminal retrieval application performs processing, based on the nodes IDs stored in the terminal device table and the corresponding device information, to display a message, e.g., "Please connect to ○○○○", on the display unit 303 of the PC 103 (step S706). While the second embodiment is described above as displaying only the device information of the node for which additional connection is allowed, in the form of a message, a table containing the device information of the relevant terminal device and the number of vacant ports thereof in corresponding relation may be displayed on the display unit 303, by way of example, as shown in FIG. 9.

After the processing of step S705 or S706, the terminal retrieval application detects whether the above-mentioned bus reset has occurred on the communication system (step S707).

If the bus reset has occurred, the communication system of this embodiment executes the processing to re-recognize the connection configuration, and then updates the information relating to the connection configuration of the communication system (i.e., the topology map information) based on the obtained data. Thus, when the occurrence of bus reset is detected, the terminal retrieval application performs the processing to re-recognize the connection configuration and to communicate again with the device serving as the bus manager. After that, the terminal retrieval application reads the topology map information stored in that device, and executes the sequence of processing from step S702.

If the occurrence of bus reset is not detected, the terminal retrieval application executes the processing of step S707 until a command instructing the end of that application is input. Upon the command being input (S708), the terminal retrieval application is ended.

By executing the sequence of processing described above, the PC 103 can not only automatically retrieve the device information of individual terminal devices and a vacant state of each port of the device, but can also display the retrieval information on the display unit 303 as needed. Consequently, users can more easily and more comprehensively recognize the communication port to which a new device is connectable.

Figure 10:
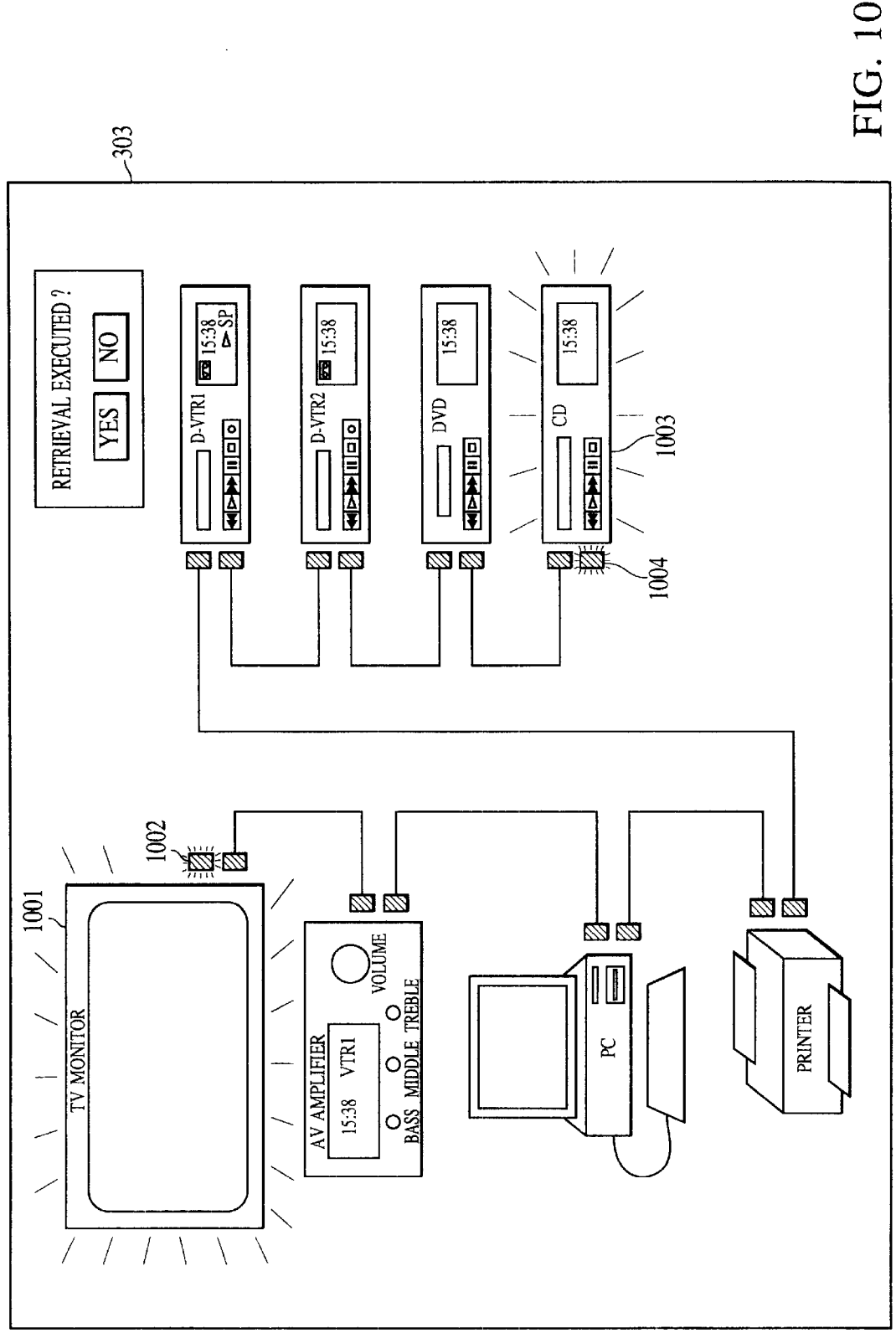
FIG. 10 is a representation showing another example of a screen image displayed on the PC in the second embodiment.

While the second embodiment is described above as displaying the device information of the terminal device for which additional connection is allowed and the number of vacant ports thereof together, as shown in FIG. 9, it is also possible to display them graphically along with the topology of the network, by way of example, as shown in FIG. 10. In such a case, the control unit 306 of the PC 103 creates icons representing the device information of individual devices and the ports thereof, and displays the topology of the network on a screen of the monitor 303 based on the topology map information (specifically the parent-child relation among ports). FIG. 10 shows one example of a screen image displayed on the monitor 303. In FIG. 10, the retrieval result of the terminal retrieval application is displayed by blinking icons (1001–1004) which represent the devices, for which additional connection is allowed, and the vacant ports thereof so that users can easily recognize the system situation. As a result of such processing, the PC 103 enables users to recognize the connection port of the device, for which additional connection is allowed, along with the topology of the network in a manner more easy to understand.

(Third Embodiment)

In a third embodiment, still another example of the terminal retrieval application modified from that in the above first embodiment is employed.

The terminal retrieval application used in the above first embodiment retrieves the terminal device based on the topology map information under management of the bus manager. The retrieval result is then indicated by, e.g., the indication lamp 111 provided on each device.

The terminal retrieval application used in the above second embodiment retrieves an identification of the terminal device based on the topology map information under management of the bus manager, and also inquires the device information of individual devices. The retrieval result and the inquired device information are then visually displayed on the display unit 303 of the PC 103 in corresponding relation.

However, the terminal retrieval application can be further used to inquire the bus manager for not only the topology map information, but also power management information (i.e., information relating to characteristic of power supplied to or consumed by individual devices). By processing the power management information, the terminal retrieval application according to the third embodiment can retrieve the terminal device in match with the power characteristic of a port newly connected device, and can visually notify users of the retrieval result. The processing operation of the terminal retrieval application according to the third embodiment will be described below with reference to FIGS. 11 and 12.

In response to an instruction from the terminal retrieval application, the PC 103 displays a message, e.g., "Please input connector type", on the display unit 303 (step S1101). Here, there are two connector types for the 1394 serial bus cable 110 used in this embodiment. More specifically, there are a 6-pin type cable made up of two sets of twisted-pair cables (one set serving to transmit data signals and the other set serving to transmit strobe signals) and a pair cable for power supply, and a 4-pin type cable including no pair cable for power supply. In accordance with the prompt displayed in step S1101, the user inputs the connector type (4-pin or 6-pin) of the device to be additionally connected from the console 301.

The terminal retrieval application determines the connector type input by the user (step S1102). If the connector type is the 6-pin type, a "Type" register is loaded with "1" (step S1103), and if it is the 4-pin type, the "Type" register is loaded with "2" (step S1104).

After the processing of step S1103 or S1104, the terminal retrieval application instructs the PC 103 to communicate with the bus manager and read the topology map information (step S1105).

After reading the topology map information from the bus manager, the terminal retrieval application instructs retrieval of an identification of the terminal device which has a vacant port in match with the input connector type (step S1106). The processing executed in step 1106 to make such retrieval of the terminal device will be described in detail with reference to a flowchart of FIG. 13.

Figure 13:
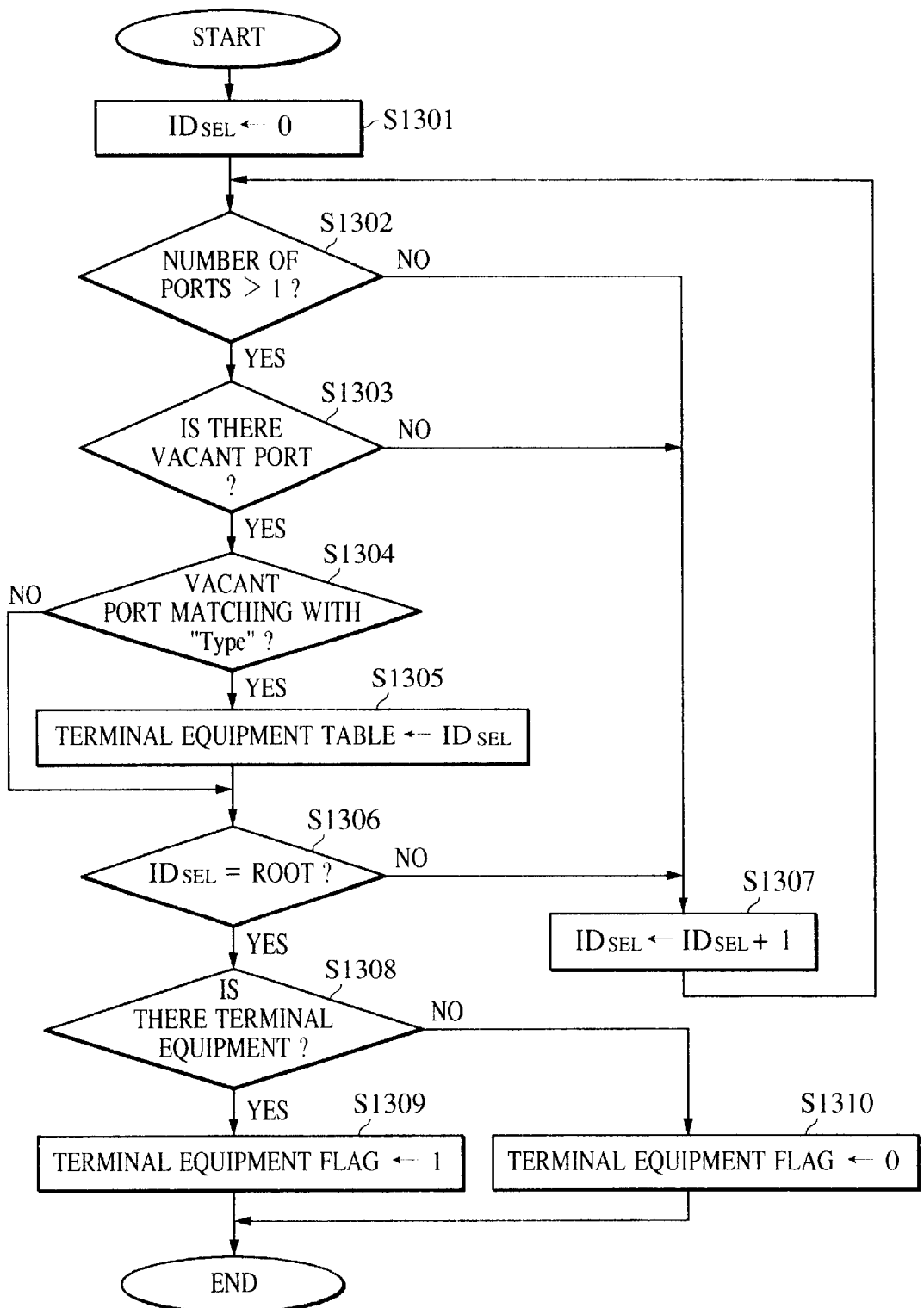
FIG. 13 is a flowchart for explaining in detail the processing of step S1106 of the terminal retrieval application in the third embodiment.

In FIG. 13, the terminal retrieval application first loads an initial value "0" in a register $ID_{SEL}$ which stores the node number of the checked node in successive order (step S1301). Then, the terminal retrieval application detects the number of communication ports of the node, which corresponds to the value of the register $ID_{SEL}$, from the topology map information (step S1302). If the number of communication ports of the relevant node is not larger than "1" as a result of step S1302, the terminal retrieval application determines that additional connection to the relevant node is not allowed. The terminal retrieval application then increments the value of the register $ID_{SEL}$ by one (step S1307).

If the number-of communication ports of the relevant node is larger than "1" as a result of step S1302, the terminal retrieval application detects from the topology map information whether the relevant node has a vacant port (step S1303). If there is no vacant port in the relevant node as a result of step S1303, a new device cannot be connected to the relevant node. Therefore, the terminal retrieval application increments the value of the register $ID_{SEL}$ by one and then checks the next node (step S1307).

If there is a vacant port in the relevant node as a result of step S1303, the terminal retrieval application asks the bus manager for the power management information of the relevant node. Based on the inquiry result, the terminal retrieval application determines whether the power characteristic of the vacant port is in match with the condition loaded in the aforesaid "Type" register (step S1304). Specifically, if the device to be additionally connected has a 4-pin type connector, it is determined whether the vacant port is the type incapable of supplying power, and if the device to be additionally connected has a 6-pin type connector, it is determined whether the vacant port is the type capable of supplying or receiving power.

After the processing of step S1304, if the connector type of the vacant port of the relevant terminal device matches the connector type of the device to be additionally connected, the terminal retrieval application loads the node ID and the number of vacant ports of the relevant terminal device in a terminal device table which is stored in the memory 307 (step S1305). If the connector type of the vacant port does not match the connector type of the device to be additionally connected, the terminal retrieval application does not load the node ID, etc., of the relevant terminal device in the terminal device table.

The terminal retrieval application compares the value of the register $ID_{SEL}$ with the node number of the root to confirm whether the retrieval processing has been completed for all the nodes (step S1306). If the value of the register $ID_{SEL}$ is smaller than the node number of the root as a result of step S1306, the terminal retrieval application determines that the retrieval processing has not been completed for all the nodes, and then increments the value of the register $ID_{SEL}$ by one (step S1307).

If the value of the register $ID_{SEL}$ is not smaller than the node number of the root as a result of step S1306, the terminal retrieval application determines that the retrieval processing has been completed for all the nodes, and then checks the contents of the terminal device table to detect whether the terminal device is stored (step S1308). If the terminal device is stored as a result of step S1308, the terminal retrieval application sets the terminal device flag to "1" (step S1309). If there is stored no terminal device, the terminal retrieval application sets the terminal device flag to "0" (step S1310). After the completion of the processing of step S1309 or S1310, the terminal retrieval application comes to the end of the processing to retrieve the terminal device identification (i.e., the processing of step S1106).

After the processing of step S1106, the terminal retrieval application determines from the contents of the terminal device flag whether a new device can be additionally connected (step S1107). If the terminal device flag is "0", the terminal retrieval application instructs display of a message, e.g., "There is no connectable port", on the display unit 303 of the PC 103 (step S1109). If the terminal device flag is "1", the terminal retrieval application instructs the device which corresponds to the node ID stored in the terminal device table, to blink (or illuminate) (step S1108), and at the same time instructs display of a message, e.g., "Please connect to a blinking device", on the display unit 303 of the PC 103 (step S1110). The node having received the command for blinking causes the indication lamp 111 to blink.

After the processing of step S1109 or S1110, the terminal retrieval application detects whether the above-mentioned bus reset has occurred on the communication system (step S1111).

If the bus reset has occurred, the communication system of this embodiment executes the processing to re-recognize the connection configuration, and then updates the information relating to the connection configuration of the communication system (i.e., the topology map information) based on the obtained data. Thus, when the occurrence of bus reset is detected, the terminal retrieval application performs the processing to re-recognize the connection configuration and to communicate with the device serving as the bus manager again. After that, the terminal retrieval application reads the topology map information stored in that device in step S1105, and executes the sequence of processing from step S1106.

If the occurrence of bus reset is not detected, the terminal retrieval application executes the processing of step S1111 until a command instructing the end of that application is input. Upon the command being input (S1112), the terminal retrieval application is ended.

By executing the sequence of processing described above, the PC 103 can automatically retrieve the terminal device which is in match with the connector type of the device to be additionally connected. Also, the PC 103 can inform users of the connectable device in a way concrete and easy to understand. Consequently, users can easily recognize the terminal device in match with the connector type of the device to be additionally connected.

In the third embodiment described above, the terminal retrieval application controls so as to blink (or illuminate) the indication lamp 111 of the device which is in match with the connector type of the device to be additionally connected. As an alternative, a table containing the device information of the relevant terminal device and the number of vacant ports thereof in corresponding relation may be displayed on the display unit 303 of the PC 103 as with the second embodiment.

For example, where the TV monitor 101 has one vacant port of the 4-pin type and the CD 108 has one vacant port of the 6-pin type, the PC 103 can display the retrieval result of the terminal retrieval application according to the third embodiment as shown in FIG. 14. FIG. 14 is a representation showing one example of a screen image displayed on the monitor 303 of the PC 103. Note that FIG. 14 shows the retrieval result obtained when the device to be added has a 4-pin type connector.

Figure 15:
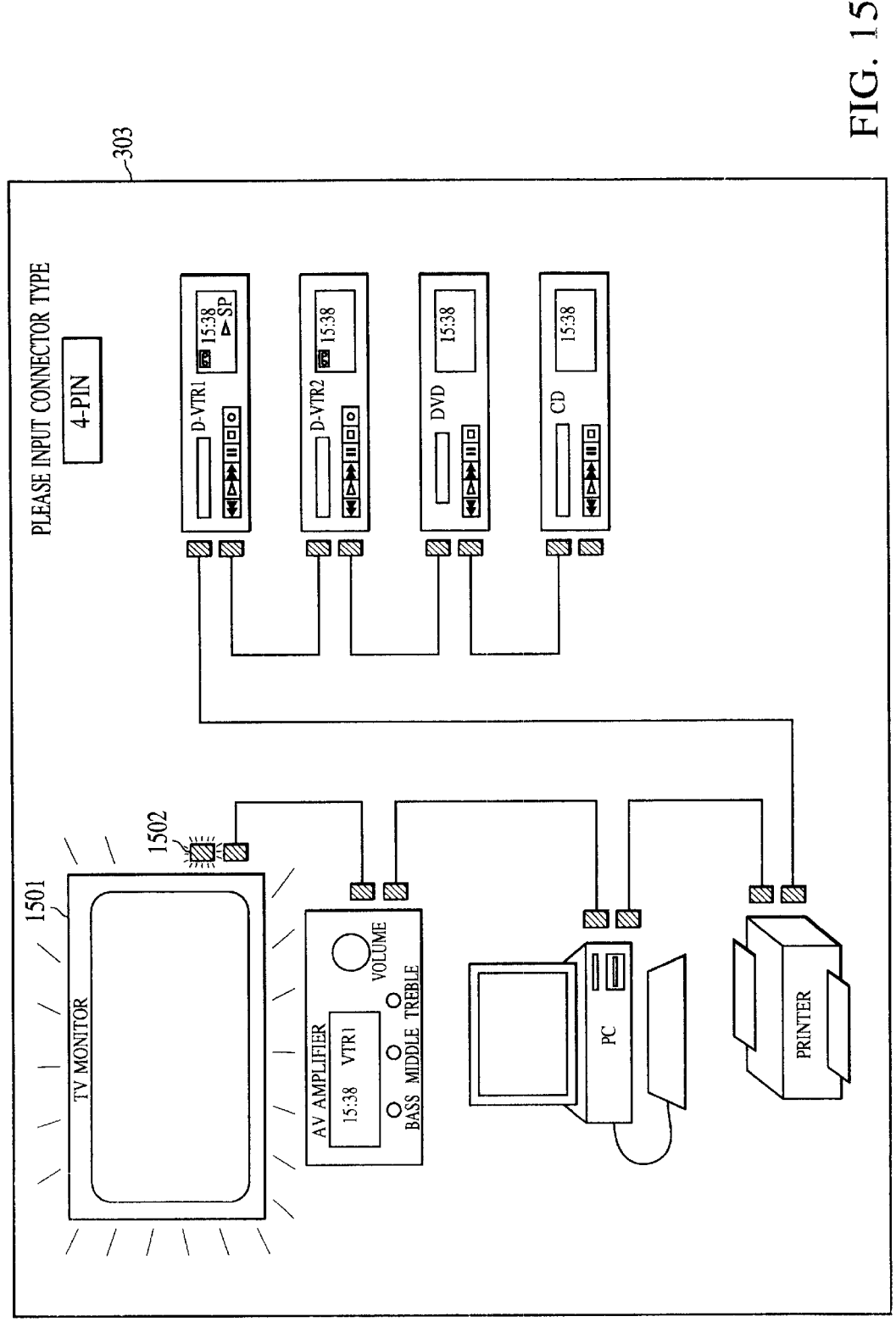
FIG. 15 is a representation showing another example of a screen image displayed on the PC in the third embodiment.

Also, while FIG. 14 of this third embodiment shows one example of the screen image displaying the device information of the terminal device for which additional connection is allowed, and the number of vacant ports thereof together, it is also possible to display them graphically along with the topology of the network, by way of example, as shown in FIG. 15. In such a case, the control unit 306 of the PC 103 creates icons representing the device information of individual devices and the ports thereof, and displays the topology of the network on the screen of the monitor 303 based on the topology map information. FIG. 15 shows one example of a screen image displayed on the monitor 303. In FIG. 15, the retrieval result of the terminal retrieval application is displayed by blinking icons (1501, 1502) which represent the devices for which additional connection is allowed, and the vacant port thereof, so that users can easily recognize the system situation. As a result of such processing, the PC 103 enables users to recognize the connection port of the device for which additional connection is allowed, along with the topology of the network in a manner more easy to understand.

(Fourth Embodiment)

In a fourth embodiment, still another example of the terminal retrieval application modified from that in the above third embodiment is employed.

The terminal retrieval application used in the above third embodiment retrieves an identification of the terminal device based on the topology map information under management of the bus manager, and further retrieves the device from among those devices which match the connector type (i.e., 4-pin or 6-pin type) of the device to be additionally connected, based on the power management information. The retrieval result is then indicated by the indication lamp 111 provided on each device.

In addition to the above processing in the third embodiment, the following processing is added by the terminal retrieval application used in this fourth embodiment. When there is no vacant port for which additional connection is allowed, the terminal retrieval application executes processing to select those devices which are in match with the connector type of the device to be added, and to inform users of the device whose cable is to be removed for connection to the device to be added.

Figure 16:
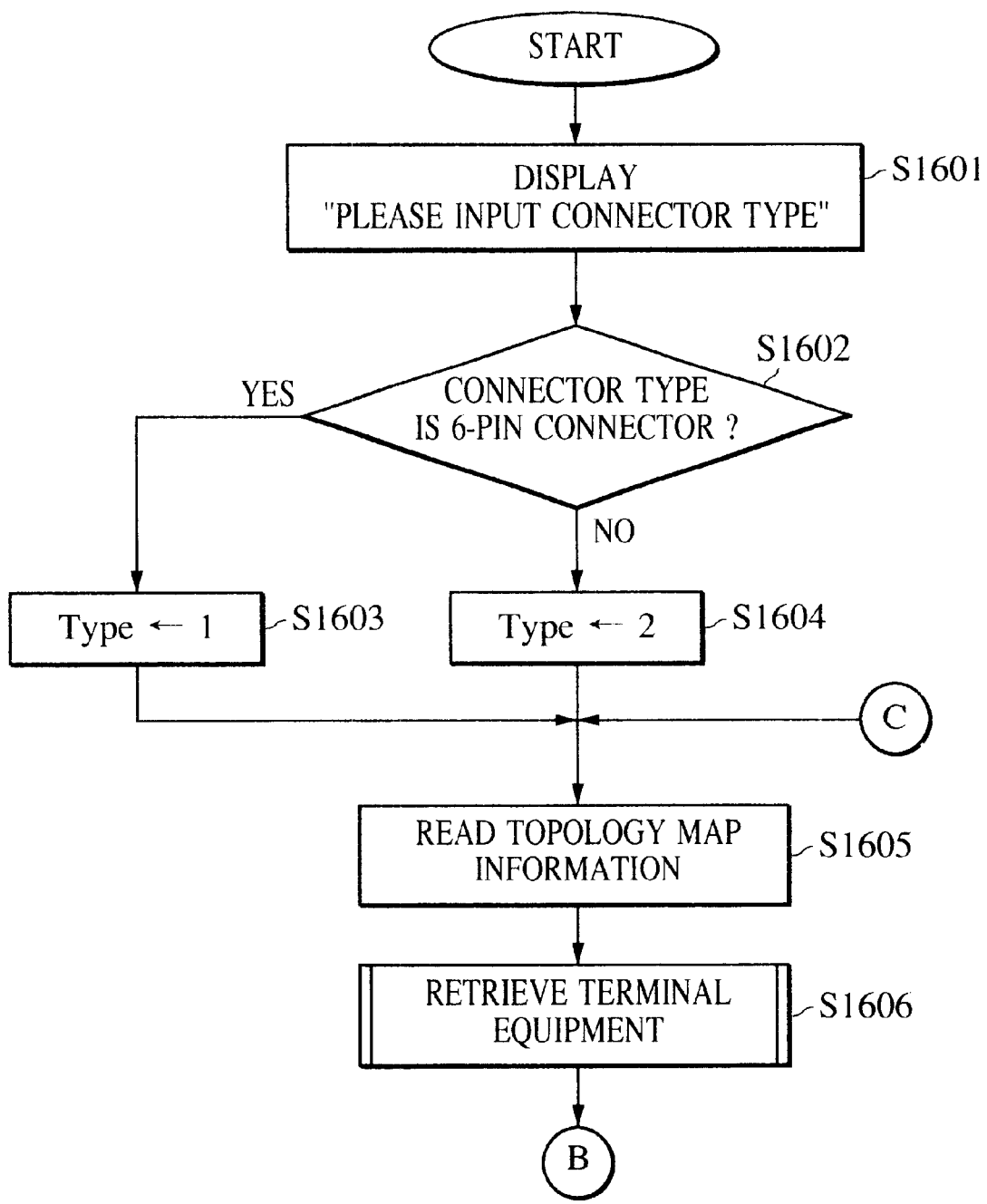
FIG. 16 is part of a flowchart for explaining the processing of the terminal retrieval application in a fourth embodiment.
Figure 17:
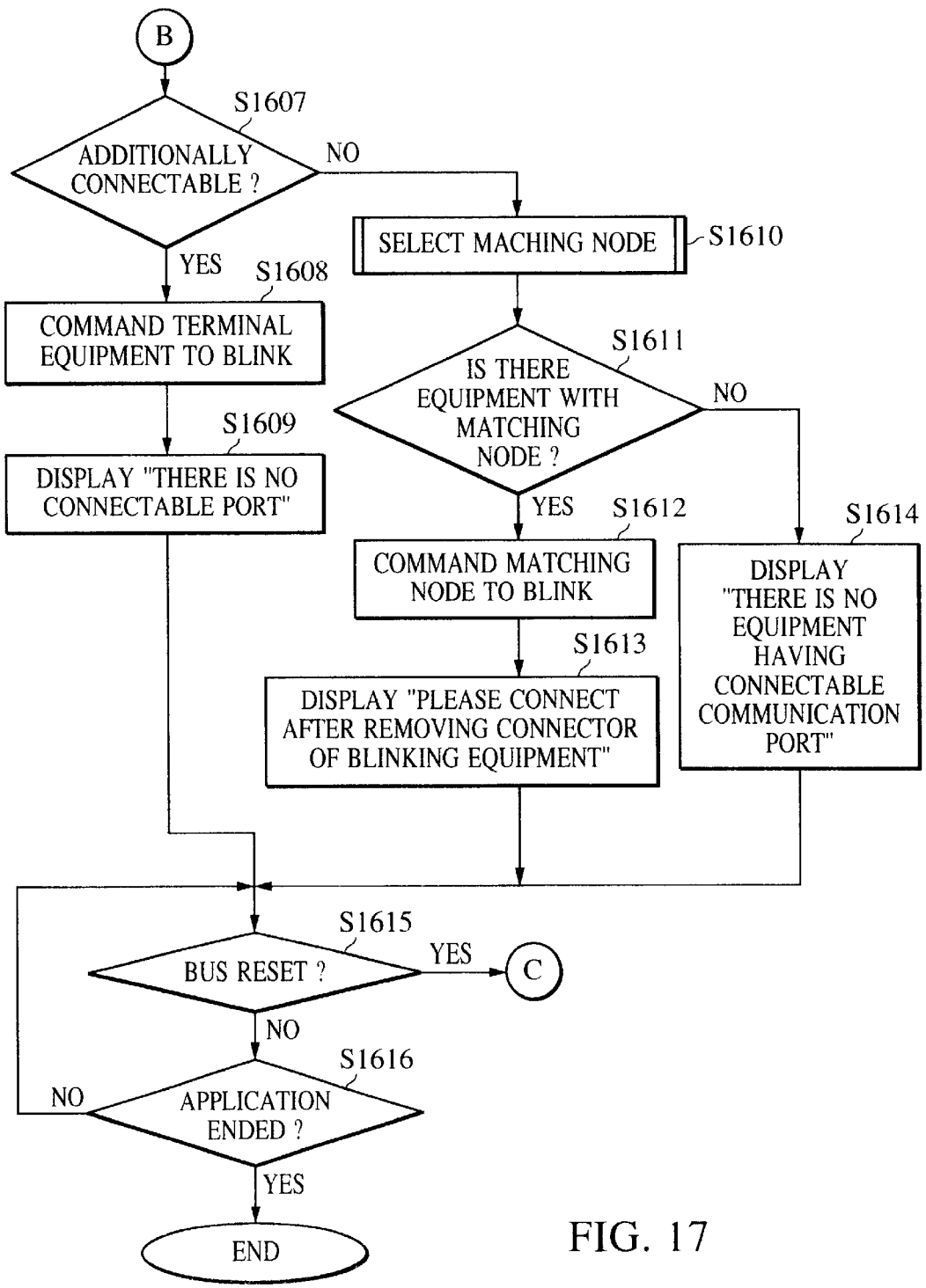
FIG. 17 is part of a flowchart for explaining the processing of the terminal retrieval application in the fourth embodiment.

The processing operation of the terminal retrieval application according to the fourth embodiment will be described below with reference to FIGS. 16 and 17.

In response to an instruction from the terminal retrieval application, the PC 103 displays a message, e.g., "Please input connector type", on the display unit 303 (step S1601). In accordance with the prompt displayed in step S1601, the user inputs the connector type of the device to be additionally connected from the console 301.

The terminal retrieval application determines the connector type input by the user (step S1602). If the connector type is the 6-pin type, the "Type" register is loaded with "1" (step S1603), and if it is the 4-pin type, the "Type" register is loaded with "2" (step S1604).

After the processing of step S1603 or S1604, the terminal retrieval application instructs the PC 103 to communicate with the bus manager and acquire the topology map information under management of the bus manager (step S1605).

After acquiring the topology map information from the bus manager, the terminal retrieval application instructs retrieval of the terminal device based on the topology map information and the input connector type (step S1606). The processing of step 1606 in this fourth embodiment is executed in a like manner to the processing shown in FIG. 13, thereby forming the terminal device table and the terminal device flag. The terminal device table stores the node ID of the terminal device which matches the connector type of the device to be additionally connected, and the number of vacant ports thereof.

After the processing of step S1606, the terminal retrieval application determines from the contents of the terminal device flag whether a new device can be additionally connected (step S1607). If the terminal device flag is "1", the terminal retrieval application instructs the device which has the node ID stored in the terminal device table, to blink (or illuminate) (step S1608), and at the same time instructs display of a message, e.g., "Please connect to a blinking device", on the display unit 303 of the PC 103 (step S1609).

If the terminal device flag is "0", the terminal retrieval application executes processing to select the matching node, i.e., processing to select the device whose cable is to be disconnected from the network when a new device is additionally connected (step S1610).

The processing operation of step S1610 executed by the terminal retrieval application according to the fourth embodiment will be described in detail with reference to a flowchart of FIG. 18.

Figure 18:
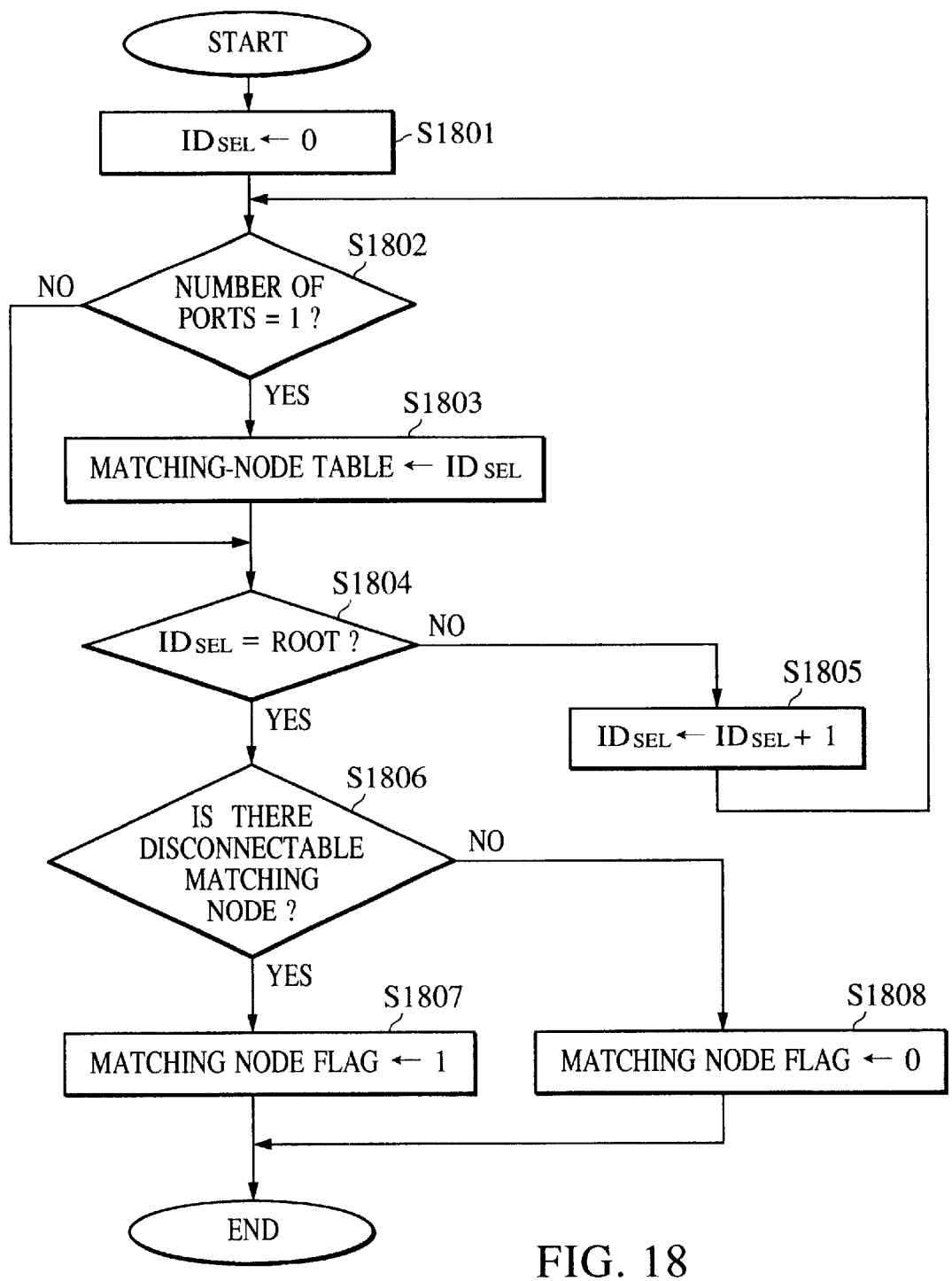
FIG. 18 is a flowchart for explaining in detail the processing of step S1106 of the terminal retrieval application in the fourth embodiment.

In FIG. 18, the terminal retrieval application first loads an initial value "0" in a register $ID_{SEL}$ (step S1801). Here, the register $ID_{SEL}$ is a register for storing the node number of the checked node in successive order. Then, the terminal retrieval application asks the bus manager whether the number of communication ports of the node, which corresponds to the value of the register $ID_{SEL}$, is "1" (i.e., whether the checked node is a leaf) (step S1802). If the number of communication ports of the relevant node is "1", the terminal retrieval application asks the bus manager for the power management information of the relevant node, and then loads the node ID and the power characteristic of the relevant node in a matching node table stored in the memory 307 (step S1803). If the number of communication ports of the relevant node is other than "1", the terminal retrieval application loads no data in the matching node table.

The terminal retrieval application compares the value of the register $ID_{SEL}$ with the node number of the root to confirm whether the retrieval processing has been completed for all the nodes (step S1804). If the value of the register $ID_{SEL}$ is smaller than the node number of the root as a result of step S1804, the terminal retrieval application determines that the retrieval processing has not been completed, and then increments the value of the register $ID_{SEL}$ by one (step S1805).

If the value of the register $ID_{SEL}$ is not smaller than the node number of the root as a result of step S1805, the terminal retrieval application determines that the retrieval processing has been completed for all the nodes.

After the retrieval processing has been executed for all the nodes, the terminal retrieval application checks the power characteristic stored in the matching node table, and determines whether the stored power characteristic matches the condition loaded in the aforesaid "Type" register (step S1806). Specifically, if the device to be additionally connected has a 4-pin type connector, it is determined whether the power characteristic of the relevant node is the type incapable of supplying power, and if the device to be additionally connected has a 6-pin type connector, it is determined whether the vacant port is the type capable of supplying or receiving power.

If there is stored a node which is in match with the aforesaid condition (referred to a "matching node" hereinafter) as a result of step S1806, the terminal retrieval application sets a matching-node flag to "1" (step S1807). If there is stored no matching node, the terminal retrieval application sets the matching-node flag to "0" (step S1808). After the processing of step S1807 or S1808, the terminal retrieval application comes to the end of the processing to retrieve the matching node (i.e., the processing of step S1610).

After the processing of step S1610, the terminal retrieval application detects the contents of the matching node flag and determines whether there is a device which matches the aforesaid condition and can be disconnected from the network (step S1611). If the matching node flag is "1", the terminal retrieval application reads the node ID of the matching node from the matching-node table. Then, the terminal retrieval application sends a command to the device corresponding to the read node ID for blinking (or illuminating) the indication lamp 111 thereof (step S1612), and at the same time instructs display of a message, e.g., "Please connect after removing connector of a blinking device", on the display unit 303 of the PC 103 (step S1613). If the matching node flag is "0", this means that no port having the same connector type as the port of the device to be added is present in the communication system. The terminal retrieval application therefore instructs display of a message, e.g., "There is no device having connectable communication port", on the display unit 303 of the PC 103 (step S1614).

After the processing of step S1609, S1613 or S1614, the terminal retrieval application detects whether the above-mentioned bus reset has occurred (step S1615).

If bus reset has occurred, the communication system of this embodiment executes the processing to re-recognize the connection configuration, and then updates the information relating to the connection configuration of the communication system (i.e., the topology map information) based on the obtained data. Thus, when the occurrence of bus reset is detected, the terminal retrieval application performs the processing to re-recognize the connection configuration and to communicate with the bus manager again. After that, the terminal retrieval application reads the topology map information stored in the bus manager in step S1605, and executes the sequence of processing from step S1606.

If the occurrence of bus reset is not detected, the terminal retrieval application executes the processing of step S1615 until a command instructing the end of that application is input. Upon the command being input (S1616), the terminal retrieval application is ended.

By executing the sequence of processing described above, the PC 103 can not only automatically retrieve an identification of the terminal device which matches the connector type of the device to be additionally connected (i.e., the device having a matching vacant port), but also inform users of the connectable device in a way concrete and easy to understand.

Further, when no device having a matching vacant port is present on the network, it is possible to retrieve an identification of the terminal device which matches the connector type of the port of the device to be added, and to display the retrieval result in a manner easy to recognize. Consequently, users can easily recognize the terminal device which should be disconnected from the network in place of the device to be added.

In the fourth embodiment described above, the terminal retrieval application makes control so as to blink (or illuminate) the indication lamp 111 of the device which should be disconnected from the network in place of the device to be added. As an alternative, a table containing the device information of the device disconnectable for replacement and the connector type thereof in corresponding relation may be formed and displayed on the display unit 303 of the PC 103, like the second embodiment.

For example, where the TV monitor 101 and the CD 108 have no vacant ports and only the port of the CD 108 is the 4-pin type, the PC 103 can display the retrieval result of the terminal retrieval application according to the fourth embodiment as shown in FIG. 19. FIG. 19 is a representation showing one example of a screen image displayed on the monitor 303 of the PC 103. Note that FIG. 19 shows the retrieval result obtained when the device to be added has a 4-pin type connector.

Figure 20:
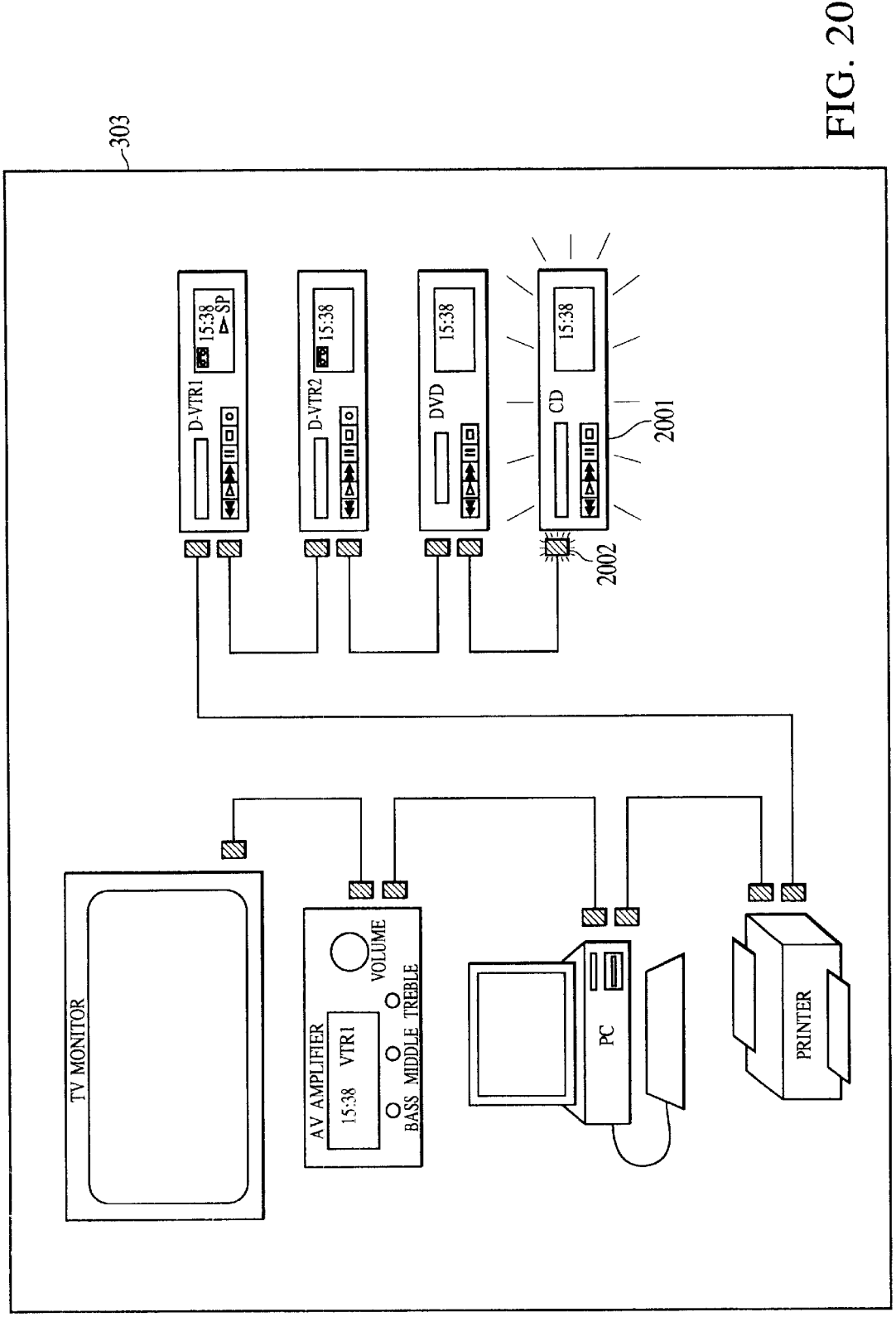
FIG. 20 is a representation showing another example of a screen image displayed on the PC in the fourth embodiment.

Also, while FIG. 19 of this fourth embodiment shows one example of the screen image displaying the device information of the terminal device which is disconnectable for replacement, and the connector type of the port thereof together, it is also possible to display them graphically along with the topology of the network, by way of example, as shown in FIG. 20. In such a case, the control unit 306 of the PC 103 creates icons representing the device information of individual devices and the ports thereof, and displays the topology of the network on the screen of the monitor 303 based on the topology map information. FIG. 20 shows one example of a screen image displayed on the monitor 303. In FIG. 20, the retrieval result of the terminal retrieval application is displayed by blinking icons (2001, 2002) which represent the device which is disconnectable for replacement, and the communication port thereof so that users can easily recognize the system situation. As a result of such processing, the PC 103 enables users to recognize the connection port of the device, which is disconnectable for displacement, along with the topology of the network in a manner more easy to understand.

(Fifth Embodiment)

In a fifth embodiment, still another example of the terminal retrieval application modified from that in the above third embodiment is employed.

The terminal retrieval application used in the above third embodiment retrieves an identification of the terminal device based on the topology map information under management of the bus manager, and further retrieves the device identification from among those which match the connector type (i.e., 4-pin or 6-pin type) of the device to be additionally connected, based on the power management information. The retrieval result is then indicated by the indication lamp 111 provided on each device.

However, the above third embodiment can be modified to include further additional processing. According to this fifth embodiment, the terminal retrieval application is designed to blink the indication lamp 111 of connectable device which is adapted for a transfer speed capability of the device to be added, based on the topology map information under management of the bus manager and speed management information (i.e., information relating to data transfer speeds adapted for individual devices). With such processing, users can be more easily informed of the connectable device.

The processing operation of the terminal retrieval application according to the fifth embodiment will be described below with reference to FIG. 21.

In response to an instruction from the terminal retrieval application, the PC 103 displays a message, e.g., "Please input maximum data transfer speed", on the display unit 303 (step S2101). Here, the 1394 interface of each device is adapted for the data transfer speed at any of 100, 200 and 400 Mbps.

In accordance with the prompt displayed in step S2101, the user inputs the maximum data transfer speed of the device to be additionally connected from the console 301.

The terminal retrieval application determines the input maximum data transfer speed, and instructs the PC 103 to communicate with the bus manager to read the topology map information (step S2102).

After reading the topology map information from the bus manager, the terminal retrieval application instructs retrieval of an identification of the terminal device which has a vacant port adapted for data transfer speeds not lower than the input transfer speed (step S2103). The processing executed in step 2103 to make such retrieval of the terminal device will be described in detail with reference to a flowchart of FIG. 22.

Figure 22:
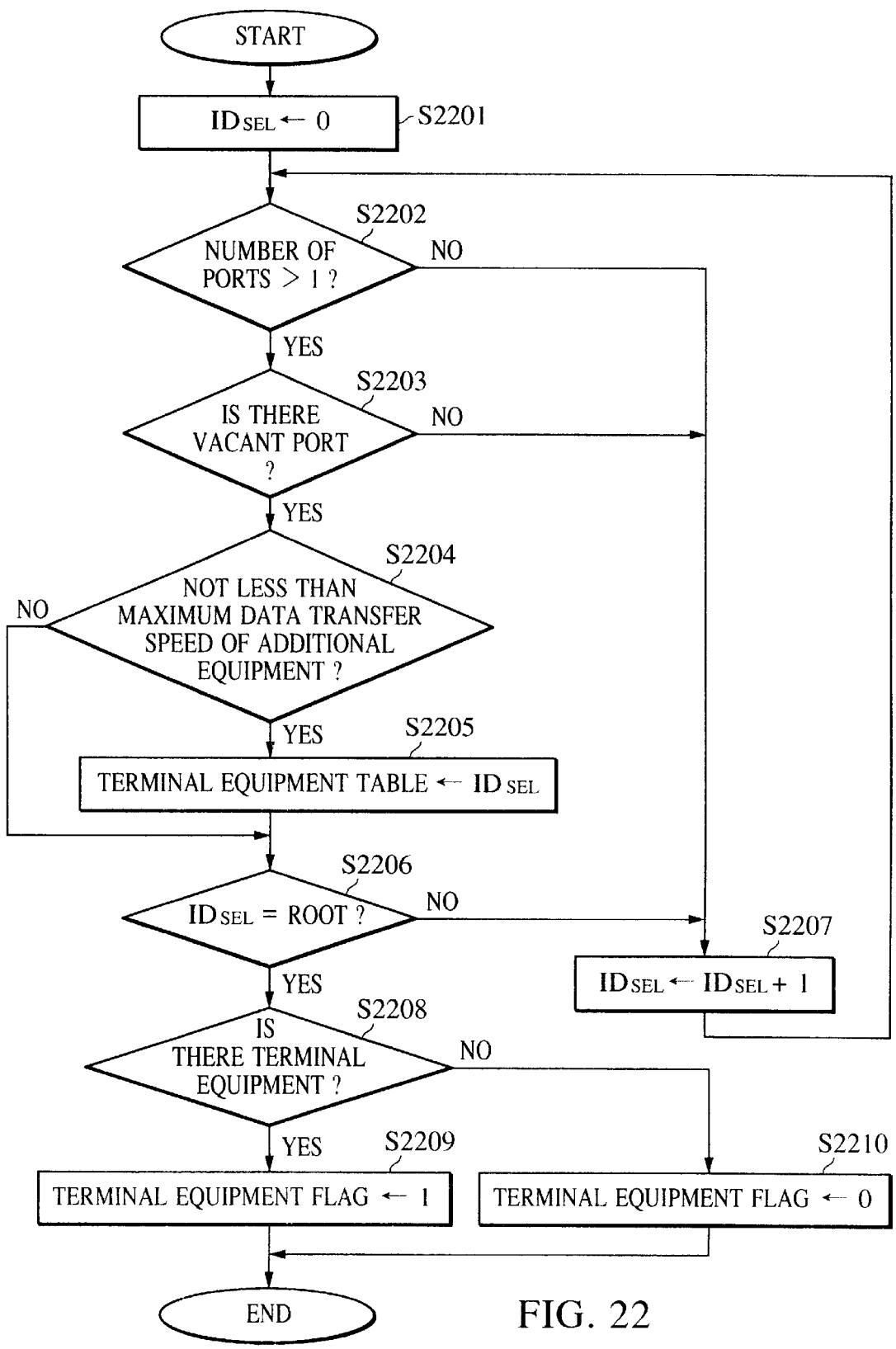
FIG. 22 is a flowchart for explaining in detail the processing of step S1106 of the terminal retrieval application in the fifth embodiment.

In FIG. 22, the terminal retrieval application first loads an initial value "0" in a register $ID_{SEL}$ (Step S2201). Here, the register $ID_{SEL}$ is a register for storing the node number of the checked node in successive order.

Then, the terminal retrieval application detects the number of communication ports of the node which corresponds to the value of the register $ID_{SEL}$, from the topology map information (step S2202). If the number of communication ports of the relevant node is not larger than "1" as a result of step S2202, the terminal retrieval application determines that additional connection to the relevant node is not allowed. The terminal retrieval application then increments the value of the register $ID_{SEL}$ by one (step S2207).

If the number of communication ports of the relevant node is larger than "1" as a result of step S2202, the terminal retrieval application detects from the topology map information whether the relevant node has a vacant port (step S2203). If there is no vacant port in the relevant node as a result of step S2203, a new device cannot be connected to the relevant node. Therefore, the terminal retrieval application increments the value of the register $ID_{SEL}$ by one and then checks the next node (step S2207).

If there is a vacant port in the relevant node as a result of step S2203, the terminal retrieval application inquires the bus manager for the maximum data transfer speed of the relevant node. Based on the inquiry result, the terminal retrieval application determines whether or not the obtained maximum data transfer speed is lower than the maximum data transfer speed of the device to be added (step S2204).

After the processing of step S2204, if the maximum data transfer speed of the vacant port of the relevant terminal device is not lower than that of the device to be added, the terminal retrieval application loads the node ID, the number of vacant ports and the maximum data transfer speed of the relevant terminal device in a terminal device table which is stored in the memory 307 (step S2205). If the maximum data transfer speed of the vacant port of the relevant terminal device is lower than that of the device to be added, the terminal retrieval application loads nothing in the terminal device table.

The terminal retrieval application compares the value of the register $ID_{SEL}$ with the node number of the root to confirm whether the retrieval processing has been completed for all the nodes (step S2206). If the value of the register $ID_{SEL}$ is smaller than the node number of the root as a result of step .S2206, the terminal retrieval application determines that the retrieval processing has not been completed for all the nodes, and then increments the value of the register $ID_{SEL}$ by one (step S2207).

If the value of the register $ID_{SEL}$ is not smaller than the node number of the root as a result of step S2206, the terminal retrieval application determines that the retrieval processing has been completed for all the nodes, and then checks the contents of the terminal device table to detect whether the terminal device is stored (step S2208). If a terminal device identification is stored as a result of step S2208, the terminal retrieval application sets the terminal device flag to "1" (step S2209).

If there is stored no terminal device, the terminal retrieval application sets the terminal device flag to "0" (step S2210). After the completion of the processing of step S2209 or S2210, the terminal retrieval application comes to the end of the processing to retrieve the terminal device (i.e., the processing of step S2103).

After the processing of step S2103, the terminal retrieval application determines from the contents of the terminal device flag whether a new device can be additionally connected (step S2104). If the terminal device flag is "0", the terminal retrieval application instructs display of a message, e.g., "There is no connectable port", on the display unit 303 of the PC 103 (step S2106). If the terminal device flag is "1", the terminal retrieval application instructs the device which corresponds to the node ID stored in the terminal device table, to blink (or illuminate) (step S2105), and at the same time instructs display of a message, e.g., "Please connect to a blinking device", on the display unit 303 of the PC 103 (step S2107). The node which has received the command for blinking causes the indication lamp 111 to blink.

After the processing of step S2106 or S2107, the terminal retrieval application detects whether the above-mentioned bus reset has occurred on the communication system (step S2108).

If the bus reset has occurred, the communication system of this embodiment executes the processing to re-recognize the connection configuration, and then updates the information relating to the connection configuration of the communication system (i.e., the topology map information) based on the obtained data. Thus, when the occurrence of bus reset is detected, the terminal retrieval application performs the processing to re-recognize the connection configuration and to communicate with the device serving as the bus manager again. After that, the terminal retrieval application reads the topology map information stored in that device in step S2109, and executes the sequence of processing from step S2102.

If the occurrence of bus reset is not detected, the terminal retrieval application executes the processing of step S2108 until a command instructing the end of that application is input. Upon the command being input (S2109), the terminal retrieval application is ended.

By executing the sequence of processing described above, the PC 103 can automatically retrieve the terminal device which is adapted for data transfer speeds not lower than the maximum data transfer speed of the device to be additionally connected. Also, the PC 103 can inform users of the connectable device in a way easy to understand. Consequently, users can be informed of the terminal device in a concrete manner, and can construct a network in which upper limits of data transfer speeds are held matched among individual devices.

In the fifth embodiment described above, the terminal retrieval application is designed to inform users of the terminal device which is adapted for data transfer speeds not lower than the maximum data transfer speed of the device to be added, by using the indication lamp 111. As an alternative, a table containing the device information, the maximum data transfer speed and the number of vacant ports of the relevant terminal device in corresponding relation may be displayed on the display unit 303 of the PC 103, as in the second embodiment.

For example, where the vacant port of the TV monitor 101 has a maximum data transfer speed of 400 Mbps and the vacant port of the CD 108 has a maximum data transfer speed of 100 Mbps, the PC 103 can display the retrieval result of the terminal retrieval application according to the fifth embodiment as shown in FIG. 23. FIG. 23 is a representation showing one example of a screen image displayed on the monitor 303 of the PC 103. Note that FIG. 23 shows the retrieval result obtained when the device to be added has a maximum data transfer speed of 100 Mbps. By thus displaying the maximum data transfer speed of the relevant terminal device along with the device information thereof, the device to be added can be connected to the device which can maximally make use of the data transfer capability of the added device. It is hence possible to construct a network in which data transfer speeds are held within an upper limit of any one among individual devices, and to realize an optimum communication environment.

Figure 24:
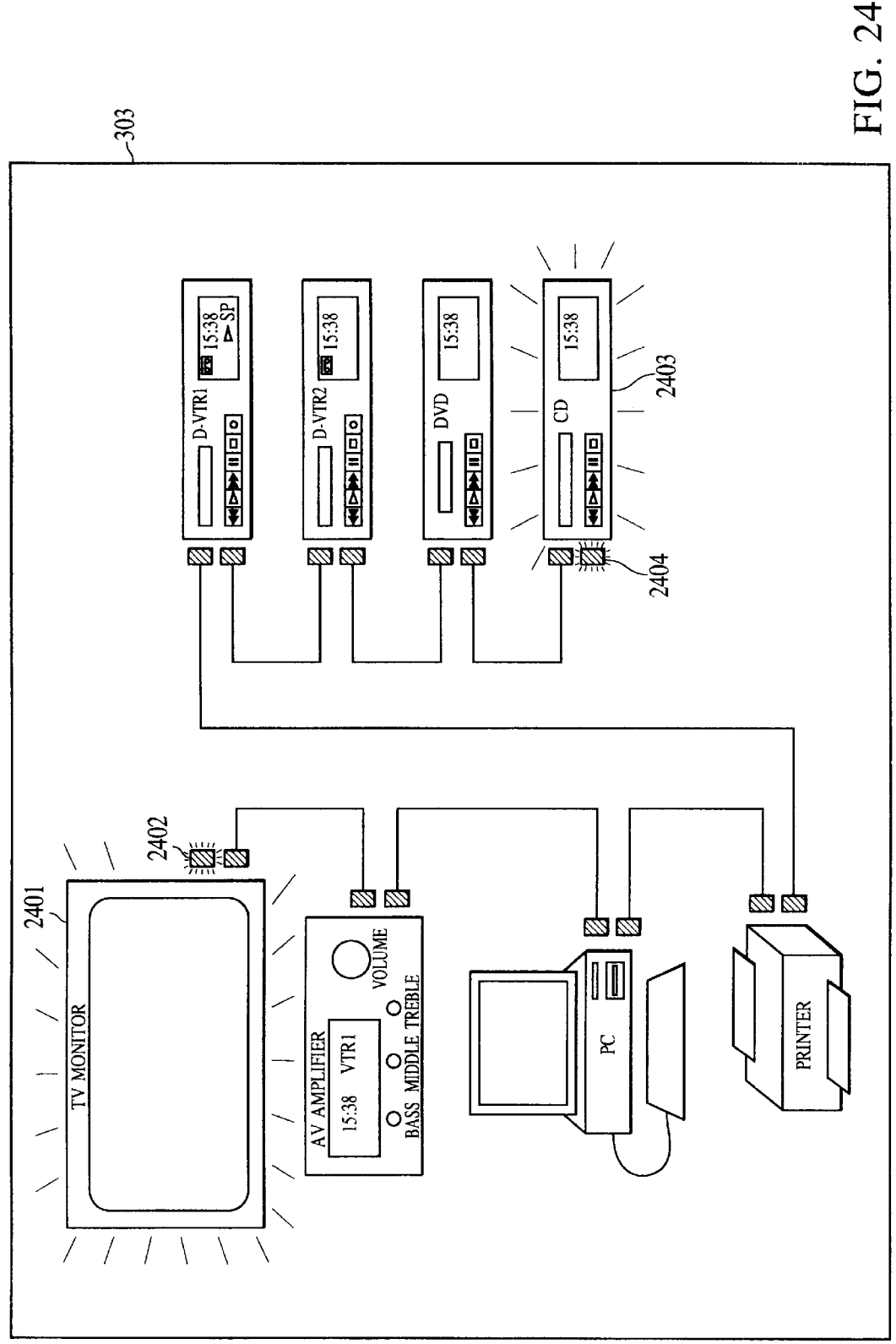
FIG. 24 is a representation showing another example of a screen image displayed on the PC in the fifth embodiment.

Also, while FIG. 23 of this fifth embodiment shows one example of the screen image displaying the device information of the terminal device to be added and the maximum data transfer speed of the communication port thereof together, it is also possible to display them graphically along with the topology of the network, by way of example, as shown in FIG. 24. In such a case, the control unit 306 of the PC 103 creates icons representing the device information of individual devices and the ports thereof, and displays the topology of the network on the screen of the monitor 303 based on the topology map information. FIG. 24 shows one example of a screen image displayed on the monitor 303. In FIG. 24, the retrieval result of the terminal retrieval application is displayed by blinking icons (2401–2404) which represent the devices for which additional connection is allowed, and the vacant port thereof, so that users can easily recognize the system situation. As a result of such processing, the PC 103 enables users to recognize the connection port of the devices for which additional connection is allowed, along with the topology of the network in a manner more easy to understand.

It is to be noted that the present invention can be implemented in various forms without departing the spirit and main features of the invention.

For example, the present invention can be constructed so as to supply a storage medium, on which program codes of the software capable of realizing the functions of any of the above-described embodiments are recorded, to a control unit (including a microcomputer) of the system or apparatus of the embodiment. With such a construction, the present invention can be implemented by operating various processing circuits of the system or apparatus of the embodiment so that the control unit of the system or apparatus reads the program codes stored in the storage medium and realizes the functions of the respective embodiment.

Figure 7:
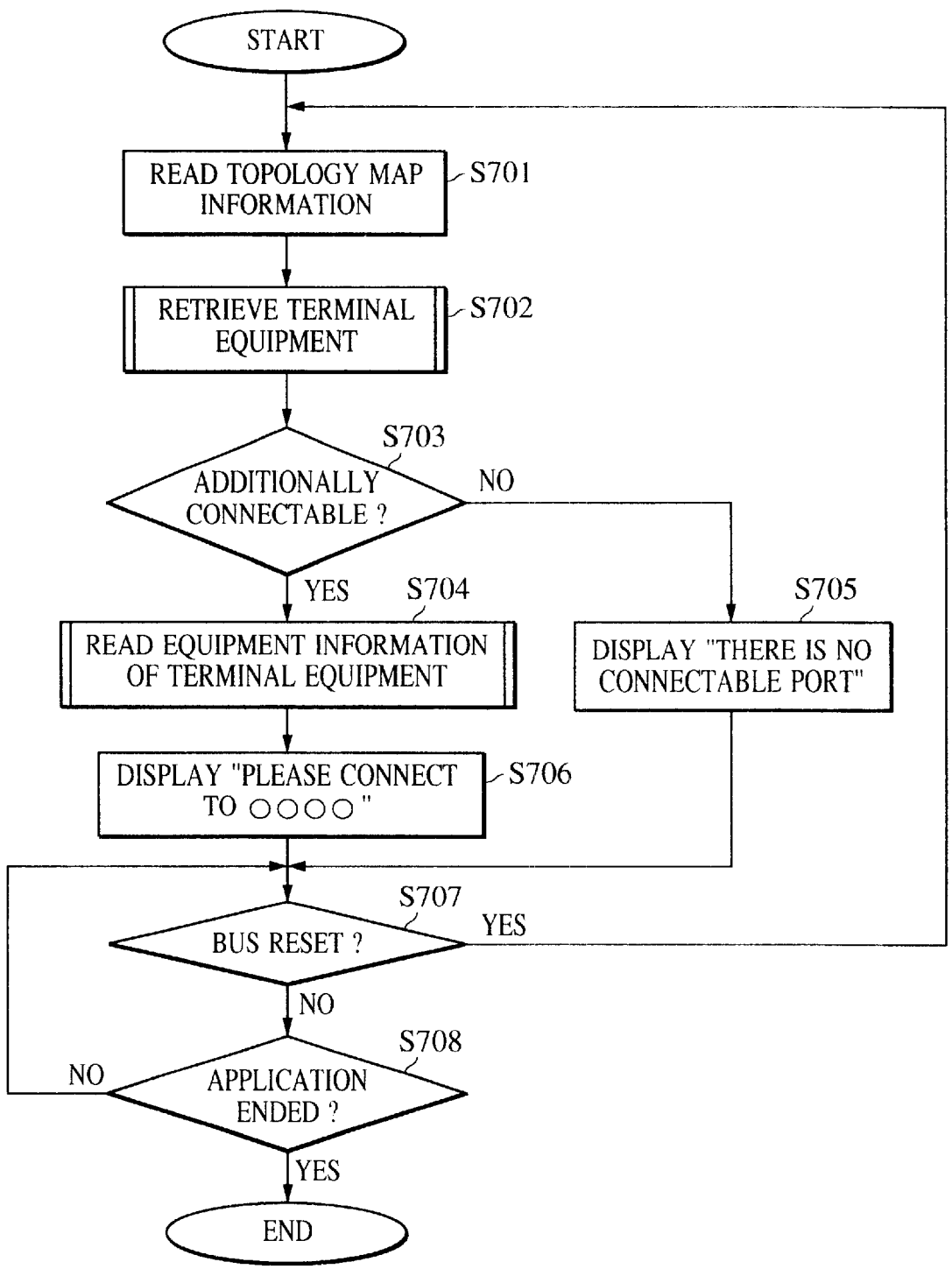
FIG. 7 is a flowchart for explaining the processing of the terminal retrieval application in a second embodiment.
Figure 11:
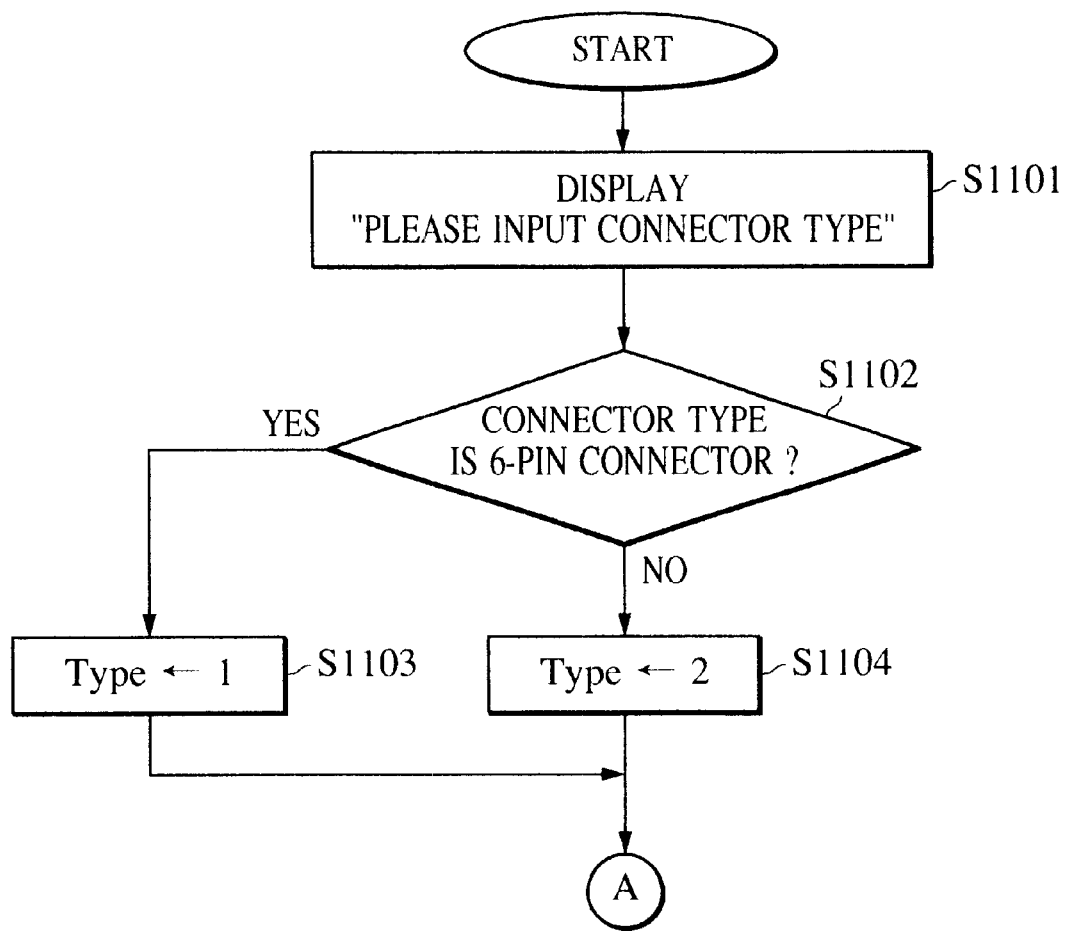
FIG. 11 is part of a flowchart for explaining the processing of the terminal retrieval application in a third embodiment.
Figure 12:
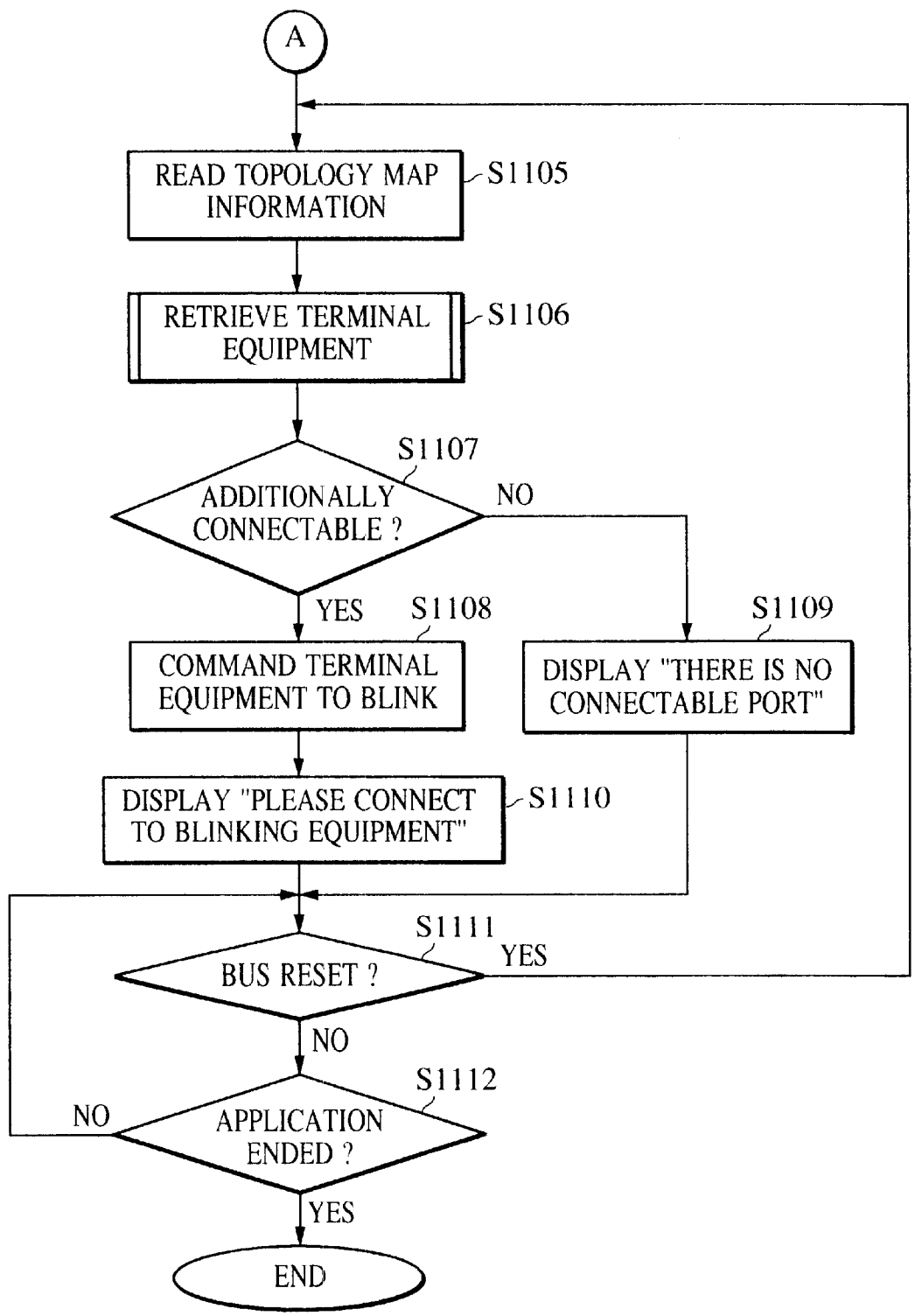
FIG. 12 is part of a flowchart for explaining the processing of the terminal retrieval application in the third embodiment.
Figure 21:
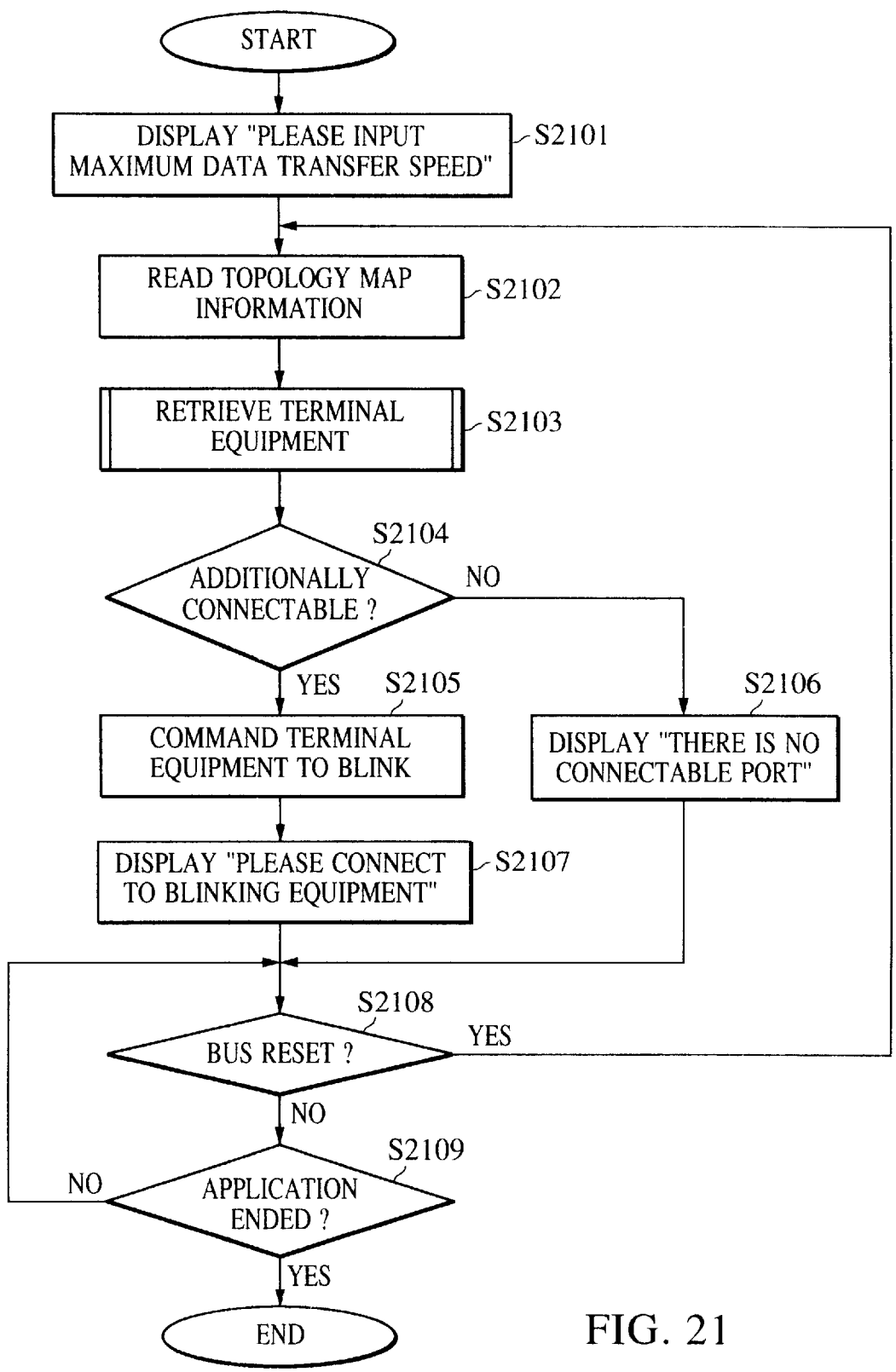
FIG. 21 is a flowchart for explaining the processing of the terminal retrieval application in a fifth embodiment.

More specifically, program codes for realizing the processing and functions shown in FIGS. 5 and 6 of the first embodiment, FIGS. 7 and 8 of the second embodiment, FIGS. 11 to 13 of the third embodiment, and FIGS. 21 and 22 of the fifth embodiment, for example, may be stored in the hard disk 320 of the PC 103. Then, the control unit 306 may read the stored program codes and operate the various processing circuits of the PC 103 to realize the functions of each embodiment.

In such a case, the program codes read from the storage medium serve in themselves to realize the above-described functions of the embodiment; hence, the storage medium storing the program codes constitutes one form of the present invention.

Suitable media for storing the program codes include, for example, floppy disks, hard disks, optical disks, photomagnetic disks, CD-ROMs, CD-Rs, magnetic tapes, non-volatile memory cards, and ROMs.

Also, it is needless to say that the functions of any of the above-described embodiments can also be realized by an OS (Operating System), other application software or the like which is working on the control unit and controls the various processing circuits of the system or apparatus of the embodiment in accordance with instructions from the program codes read out of the storage medium by the control unit. Thus, the above cases are naturally involved in the concept of the present invention.

Further, it is needless to say that the present invention involves such a case where the program codes read out of the storage medium are written into a memory built in a function add-on board mounted or a function add-on unit connected to the control unit, and a CPU incorporated in the function add-on board or unit controls the various processing circuits of the system or apparatus of the embodiment in accordance with instructions from the program codes, thereby realizing the functions of the respective embodiment.

While the PC 103 has been described as serving as a supervising unit in the above embodiments, the TV monitor 101 may be given the functions of supervising unit.

Also, while a digital interface in conformity with the IEEE 1394 Standard is used in the above embodiments as a communication interface of each of nodes constituting a network, usable interfaces are not limited to that standard. Any desired type of interface can be used so long as it has functions of automatically detecting addition, omission, etc., of an electronic device and automatically setting ID information to identify individual electronic devices on the network by itself.

It is hence to be understood that the embodiments described above are given only by way of illustrative examples in any points, and should not be construed in a limiting sense.

What is claimed is:

1. An apparatus for detecting a device whose digital interface has an unconnected physical port which satisfies a predetermined condition, the apparatus comprising:

detecting means adapted to detect a device whose digital interface has at least one unconnected physical port which satisfies a predetermined connector type, and to detect the number of the unconnected physical ports of the detected device; and display control means adapted to display first information representing the detected device and second information representing the detected number of the unconnected physical ports on a display.

2. The apparatus according to claim 1, wherein the display control means is adapted to display the first and second information with a topology of a network.

3. The apparatus according to claim 1, wherein the predetermined connector type is a first connector type including power lines or a second connector type including no power lines.

4. The apparatus according to claim 1, wherein the digital interface conforms to IEEE 1394-1995.

5. An apparatus for detecting a device whose digital interface has an unconnected physical port which satisfies a predetermined condition, the apparatus comprising:

detecting means adapted to detect a device whose digital interface has at least one unconnected physical port which satisfies a predetermined data transfer speed, and to detect the number of the unconnected physical ports of the detected device; and display control means adapted to display first information representing the detected device -and second information representing the detected number of the unconnected physical ports on a display.

6. The apparatus according to claim 5, wherein the display control means control the display so as to display the information with a topology of a network.

7. The apparatus according to claim 5, wherein the digital interface conforms to IEEE 1394-1995.

8. A method of detecting a device having an unconnected physical port which satisfies a predetermined condition, the method comprising the steps of:

detecting a device whose digital interface has at least one unconnected physical port which satisfies a predetermined connector type, and detecting the number of the unconnected physical ports of the detected device; and displaying first information representing the detected device and second information representing the detected number of the unconnected physical ports on a display.

9. The method according to claim 8, wherein the displaying step further includes displaying the first and second information with a topology of a network.

10. The method according to claim 8, wherein the predetermined connector type is a first connector type including power lines or a second connector type including no power lines.

11. The method according to claim 8, wherein the digital interface conforms to IEEE 1394-1995.

12. A medium storing a program for detecting a device having an unconnected physical port which satisfies a predetermined condition, the program comprising the steps of:

detecting a device whose digital interface has at least one unconnected physical port which satisfies a predetermined connector type, and detecting the number of the unconnected physical ports of the detected device; and displaying first information representing the detected device and second information representing the detected number of the unconnected physical ports on a display.

13. The medium according to claim 12, wherein the displaying step includes displaying the first and second information with a topology of a network.

14. The medium according to claim 12, wherein the predetermined connector type is a first connector type including power lines or a second connector type including no power lines.

15. The medium according to claim 12, wherein the digital interface conforms to IEEE 1394-1995.

16. A method of detecting a device having an unconnected physical port which satisfies a predetermined condition, the method comprising the steps of:

detecting a device whose digital interface has at least one unconnected physical port which satisfies a predetermined data transfer speed, and detecting the number of the unconnected physical ports of the detected device: and displaying first information representing the detected device and second information representing the detected number of the unconnected physical ports on a display.

17. The method according to claim 16, wherein the displaying step includes displaying the information with a topology of a network.

18. The method according to claim 16, wherein the digital interface conforms to IEEE 1394-1995.

19. A medium storing a program for detecting a device having an unconnected physical port which satisfies a predetermined condition, the program comprising the steps of:

detecting a device whose digital interface has at least one unconnected physical port which satisfies a predetermined data transfer speed, and detecting the number of the unconnected physical ports of the detected device; and displaying first information representing the detected device and second information representing the detected number of the unconnected physical ports on a display.

20. The medium according to claim 19, wherein the displaying step includes displaying the information with a topology of a network.

21. The medium according to claim 19, wherein the digital interface conforms to IEEE 1394-1995.

* * * * *